(12) United States Patent
Zhuang

(10) Patent No.: US 9,226,162 B2
(45) Date of Patent: Dec. 29, 2015

(54) SPECTRUM DIVISION METHOD, DEVICE, AND SYSTEM

(71) Applicant: Huawei Technologies Co., Ltd., Shenzhen, Guangdong (CN)

(72) Inventor: Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/671,723

(22) Filed: Mar. 27, 2015

(65) Prior Publication Data

US 2015/0208246 A1  Jul. 23, 2015

Related U.S. Application Data

(63) Continuation of application No. PCT/CN2013/076145, filed on May 23, 2013.

(30) Foreign Application Priority Data

Sep. 29, 2012  (CN) .......................... 2012 1 0374726

(51) Int. Cl.
- *H04W 72/00* (2009.01)
- *H04W 16/12* (2009.01)
- *H04W 16/10* (2009.01)
- *H04W 24/02* (2009.01)
- *H04W 72/04* (2009.01)

(52) U.S. Cl.
CPC .............. *H04W 16/12* (2013.01); *H04W 16/10* (2013.01); *H04W 24/02* (2013.01); *H04W 72/0453* (2013.01)

(58) Field of Classification Search
CPC ..... H04W 16/10; H04W 16/12; H04W 24/02; H04W 72/0453

USPC .................... 455/451, 427; 370/215, 276, 477
See application file for complete search history.

(56) References Cited

U.S. PATENT DOCUMENTS

| 3,824,597 | A * | 7/1974 | Berg ..................... H04B 10/11 370/215 |
| 6,477,369 | B1 * | 11/2002 | Moghe .................. H04W 84/14 370/316 |
| 2006/0211419 | A1 * | 9/2006 | Karabinis ............ H04B 7/2041 455/427 |
| 2009/0088083 | A1 | 4/2009 | Fujii et al. |
| 2011/0151774 | A1 | 6/2011 | Li et al. |

FOREIGN PATENT DOCUMENTS

| CN | 101325445 A | 12/2008 |
| CN | 101895891 A | 11/2010 |
| CN | 102196477 A | 9/2011 |

* cited by examiner

*Primary Examiner* — Joseph Arevalo

(57) ABSTRACT

An embodiment of the present invention discloses a spectrum division method, including: obtaining service distribution in a first area and service distribution in a second area of each base station among all base stations covered by a pre-specified network within a preset period; formulating i spectrum division schemes for the first area and second area of the network and h second area spectrum allocation schemes under each spectrum division scheme according to the obtained total service distribution in the first area of the network and total service distribution in the second area of the network; selecting an optimal spectrum division scheme and an optimal second area spectrum allocation scheme of the optimal spectrum division scheme, and sending the optimal spectrum division scheme and the optimal second area spectrum allocation scheme to the base station.

19 Claims, 11 Drawing Sheets

SPECTRUM DIVISION METHOD, DEVICE, AND SYSTEM

CROSS-REFERENCE TO RELATED APPLICATIONS

This application is a continuation of International Application No. PCT/CN2013/076145, filed on May 23, 2013, which claims priority to Chinese Patent Application No. 201210374726.2, filed on Sep. 29, 2012, both of which are hereby incorporated by reference in their entireties.

TECHNICAL FIELD

The present invention relates to the field of communications, and in particular, to a spectrum division method, device, and system.

BACKGROUND

With the constantly increasing demand for a data rate from users, the miniaturization development trend of a base station becomes increasingly evident. Therefore, services of a mobile communications network become increasingly dynamic, the number of network elements that an operator needs to maintain increases dramatically, and an invested maintenance cost also rises. In addition, high mobility of user applications leads to increasingly frequent changes of network services.

In an existing communications network, a spectrum is configured based on network planning and a deployment stage, and remains unchanged during an operation and maintenance stage. However, because the services of the mobile communications network become increasingly dynamic, a spectrum resource is not utilized rationally.

SUMMARY

Embodiments of the present invention provide a spectrum division method, device and system, so that a spectrum resource can be utilized rationally.

A first aspect of the present invention provides a spectrum division method, including:

obtaining service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station;

formulating, according to the obtained total service distribution in the first area of the network and total service distribution in the second area of the network, i spectrum division schemes for the first area of the network and the second area of the network and h second area spectrum allocation schemes corresponding to each spectrum division scheme, where the second area spectrum allocation scheme refers to dividing a spectrum allocated to the second area of the network into p pieces, and selecting one of the p pieces for a second area of the cell where each base station is located, and i, h, and p are integers greater than 0; and selecting an optimal spectrum division scheme and an optimal second area spectrum allocation scheme under the optimal spectrum division scheme, and sending the optimal spectrum division scheme and the optimal second area spectrum allocation scheme to the base station, so that the base station allocates a spectrum of the cell to the first area and second area of the cell according to the optimal spectrum division scheme and the optimal second area spectrum allocation scheme, where the optimal spectrum division scheme is one of the i spectrum division schemes, and the optimal second area spectrum allocation scheme is one of the h second area spectrum allocation schemes of the optimal spectrum division scheme.

A second aspect of the present invention provides another spectrum division method, including:

dividing a cell corresponding to a base station into a first area and a second area, where signal strength of the first area is greater than signal strength of the second area;

collecting statistics about service distribution in the first area and service distribution in the second area within a preset period, and sending the service distribution in the first area and the service distribution in the second area that are obtained through statistics to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme, where the second area spectrum allocation scheme refers to dividing a spectrum allocated to the second area into p pieces, and indicating to use one of the p pieces as a spectrum of the second area of the cell, i, h, and p are integers greater than 0, and the service distribution includes the number of activated users and a service volume;

receiving an optimal spectrum division scheme and an optimal second area spectrum allocation scheme that are sent by the control device, where the optimal spectrum division scheme is one of the i spectrum division schemes, and the optimal second area spectrum allocation scheme is one of the h second area spectrum allocation schemes under the optimal spectrum division scheme; and allocating a spectrum of the cell to the first area and the second area according to the optimal spectrum division scheme, and allocating a corresponding spectrum to the second area according to the optimal second area spectrum allocation scheme.

A third aspect of the present invention provides a control device, including: an obtaining unit, a formulating unit, and a selecting and sending unit, where:

the obtaining unit is configured to obtain service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station;

the formulating unit is configured to formulate, according to the obtained total service distribution in the first area of the network and total service distribution in the second area of the network, i spectrum division schemes for the first area of the network and the second area of the network and h second area spectrum allocation schemes corresponding to each spectrum division scheme, where the second area spectrum allocation scheme refers to dividing a spectrum allocated to the second area of the network into p pieces, and selecting one of the p pieces for a second area of the cell where each base station is located, and i, h, and p are integers greater than 0; and the selecting and sending unit is configured to select an optimal spectrum division scheme and an optimal second area spectrum allocation scheme under the optimal spectrum division scheme, and send the optimal spectrum division scheme and the optimal second area spectrum allocation scheme to the base station, so that the base station allocates a spectrum of the cell to the first area and second area of the cell according to the optimal spectrum division scheme and the optimal second area spectrum allocation scheme, where the optimal spectrum division scheme is one of the i spectrum division schemes, and the optimal second area spectrum allocation scheme is one of the h second area spectrum allocation schemes of the optimal spectrum division scheme.

A fourth aspect of the present invention provides a base station, including: an area dividing unit, a statistics collecting unit, a receiving unit, and a spectrum dividing unit, where:

the area dividing unit is configured to divide a cell corresponding to a base station into a first area and a second area, where signal strength of the first area is greater than signal strength of the second area;

the statistics collecting unit is configured to collect statistics about service distribution in the first area and service distribution in the second area within a preset period, and send the service distribution in the first area and the service distribution in the second area that are obtained through statistics to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme, where the second area spectrum allocation scheme refers to dividing a spectrum allocated to the second area into p pieces, and indicating to use one of the p pieces as a spectrum of the second area of the cell, i, h, and p are integers greater than 0, and the service distribution includes the number of activated users and a service volume;

the receiving unit is configured to receive an optimal spectrum division scheme and an optimal second area spectrum allocation scheme that are sent by the control device, where the optimal spectrum division scheme is one of the i spectrum division schemes, and the optimal second area spectrum allocation scheme is one of the h second area spectrum allocation schemes under the optimal spectrum division scheme; and the spectrum dividing unit is configured to allocate a spectrum of the cell to the first area and the second area according to the optimal spectrum division scheme received by the receiving unit, and allocate a corresponding spectrum to the second area according to the optimal second area spectrum allocation scheme.

A fifth aspect of the present invention provides a spectrum division system, including: the foregoing control device and the foregoing base station.

In the foregoing technical solutions, service distribution in a first area and service distribution in a second area of each base station among all base stations covered by a pre-specified network within a preset period are obtained; i spectrum division schemes for a first area of the network and a second area of the network and h second area spectrum allocation schemes under each spectrum division scheme are formulated according to the obtained total service distribution in the first area of the network and total service distribution in the second area of the network; an optimal spectrum division scheme and an optimal second area spectrum allocation scheme of the optimal spectrum division scheme are selected; and the optimal spectrum division scheme and the optimal second area spectrum allocation scheme are sent to the base station, so that the base station allocates a spectrum of the cell to the first area and the second area of the cell according to the optimal spectrum division scheme and the optimal second area spectrum allocation scheme. In this way, spectrum division may change when service distribution changes, and is more suitable for a dynamic service, thereby improving a utilization rate of a spectrum resource.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
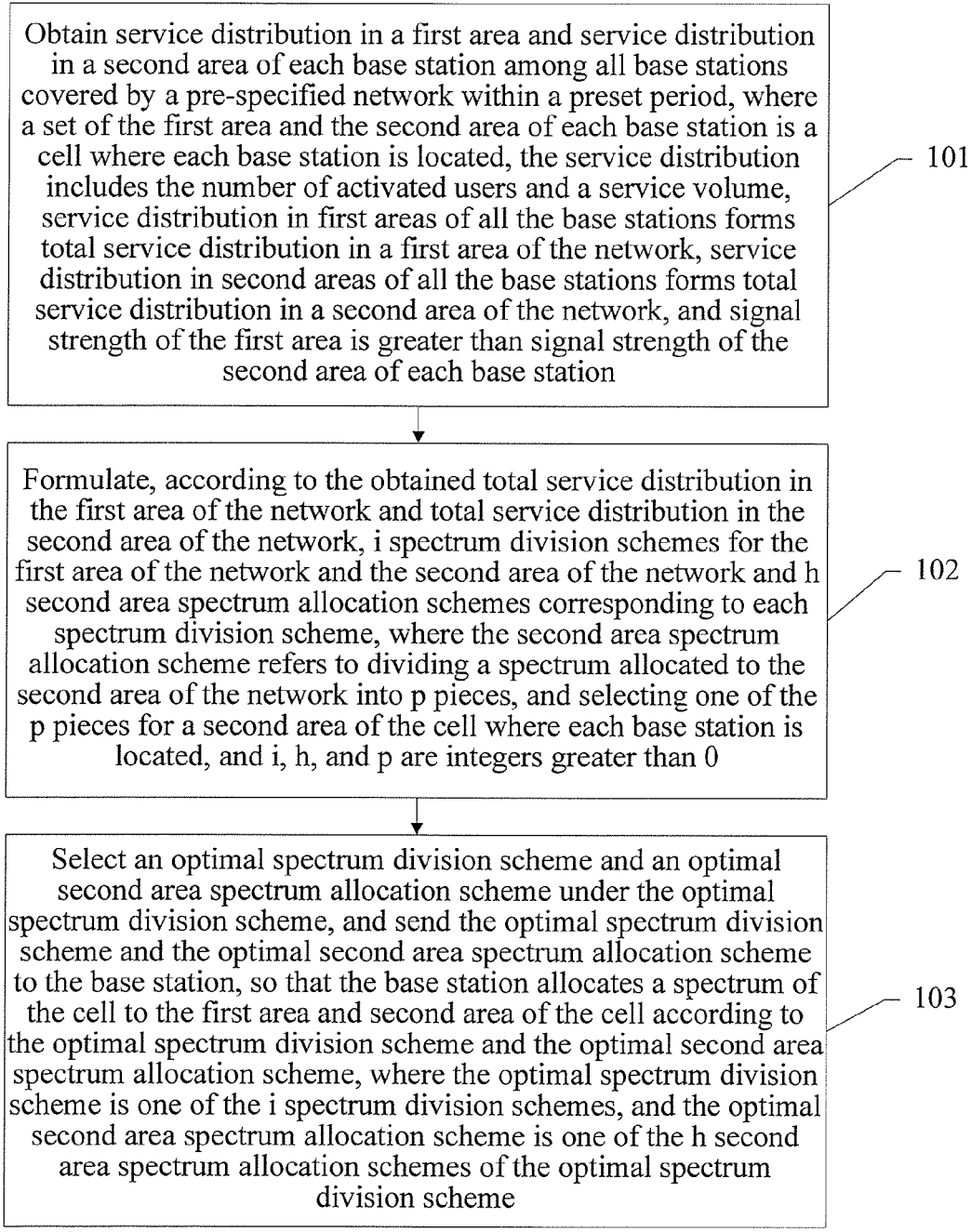
FIG. 1 is a schematic flow chart of a spectrum division method provided by an embodiment of the present invention.

FIG. 1 is a schematic flow chart of a spectrum division method provided by an embodiment of the present invention. As shown in FIG. 1, the method includes the following steps:

101: Obtain service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station.

It should be noted that the first area and the second area of each base station refer to a first area and a second area that are obtained through dividing, by each base station, a cell where the base station is located, and may also be construed as a first area and a second area that correspond to sent services in the service distribution in the first area and the service distribution in the second area of each base station within the preset period.

Optionally, the pre-specified network may specifically be a network of a certain area, for example, a network of Shenzhen area. As a reliable implementation manner, before step 101, all the base stations covered by the pre-specified network may divide cells corresponding to the base stations under the base stations into first areas and second areas. Specifically, it may be that an area in which signal receiving strength of a user is greater than or equal to a specific threshold is classified as a first area, and a remaining area is classified as a second area.

Optionally, a base station may also divide a cell into several pixels; and the base station classifies a pixel in which signal receiving strength of a user is greater than or equal to a specific threshold as a first area, and classifies a pixel in which signal receiving strength of a user is smaller than the specific threshold as a second area.

Optionally, the division may specifically be performed through the following formula:

$$CC_i = \{p \in C_i : P_{p,i} \geq \text{CELL\_CENTER\_THRESHILD} \times \max_{j \neq i}(P_{p,j})\}$$

where $C_i$ is a cell i under the base station, $CC_i$ is a first area of the cell i, p is a pixel pi of the cell i, CELL_CENTER_THRESHILD is a preset constant, $P_{p,i}$ and $P_{p,j}$ are strength of signals received by the pixel pi from the cell i and a cell j respectively, and the cell j is a neighboring cell of the cell i.

Optionally, after dividing the cell corresponding to the base station into the first area and the second area, the base station may obtain, through statistics, the service distribution in the first area and the second area. It may specifically be that reference signal receiving power (Reference Signal Receiving Power, RSRP) information sent by a user is received; in this way, service distribution at each pixel may be obtained through statistics, and it may be determined, according to a preset specific threshold (for example: CELL_CENTER_THRESHILD), whether each pixel in the preset period belongs to the first area or the second area. Therefore, the service distribution in the first area and the second area within the preset period may be obtained through statistics, that is, the number of activated users and the service volume in the first area and the second area are obtained through statistics; at the same time, a quality class indicator (Quality Class Indicator, QCI) sent by the user may also be received, and a service type requested by the user may be learned according to the QCI. In this way, the base station may obtain, through statistics, service distribution of each service type existing in the first area and the second area. For example, it is stipulated in an LTE network standard that services with QCIs being 1-4 are guarantee bit rate (Guarantee Bit Rate, GBR) services, and other services are non-guarantee bit rate (NON-GBR) services.

Optionally, after obtaining, through statistics, the service distribution in the first area and the second area, the base station may send the service distribution obtained through statistics to a control device. In this way, the service distribution in the first area and the service distribution in the second area of each base station among all the base stations covered by the pre-specified network within the preset period may be obtained in step 101.

102: Formulate, according to the obtained total service distribution in the first area of the network and total service distribution in the second area of the network, i spectrum division schemes for the first area of the network and the second area of the network and h second area spectrum allocation schemes corresponding to each spectrum division scheme, where the second area spectrum allocation scheme refers to dividing a spectrum allocated to the second area of the network into p pieces, and selecting one of the p pieces for a second area of the cell where each base station is located, and i, h, and p are integers greater than 0.

Optionally, in an embodiment, p depends on the number of neighboring cells of the cell. In an embodiment, the number of neighboring cells is usually 6, so the number of orthogonal subbands required by a cell edge is 3, that is, p may be set to 3; h depends on the number of cells of the network and a value of p, and in an embodiment, h may be a power of p, where the power is the number of cells of the network; i depends on a hardware implementation capability of an algorithm, and a value of i is generally 20.

As an optional implementation manner, the formulating i spectrum division schemes for the first area of the network and the second area of the network may specifically include:

calculating a ratio between the obtained total service distribution in the first area of the network and total service distribution in the second area of the network; and using a multiple of the ratio as a spectrum division scheme for the first area of the network and the second area of the network, where a value of the multiple is a value in a set N, and values in the set N include i positive real numbers.

In this implementation manner, the formulated spectrum division scheme is specifically a multiple of the ratio between the obtained total service distribution in the first area of the network and total service distribution in the second area of the network, where a value of the multiple is a value in a set N, and values in the set N include i positive real numbers, so as to find a suitable spectrum division scheme conveniently. For example, five spectrum division schemes may be obtained if N is set to five different values.

Optionally, five spectrum division schemes may be obtained when N is set to five different real numbers, and each spectrum division scheme has p spectrum allocation schemes; in this way, 5×p spectrum allocation schemes may be generated.

103: Select an optimal spectrum division scheme and an optimal second area spectrum allocation scheme under the optimal spectrum division scheme, and send the optimal spectrum division scheme and the optimal second area spectrum allocation scheme to the base station, so that the base station allocates a spectrum of the cell to the first area and second area of the cell according to the optimal spectrum division scheme and the optimal second area spectrum allocation scheme, where the optimal spectrum division scheme is one of the i spectrum division schemes, and the optimal second area spectrum allocation scheme is one of the h second area spectrum allocation schemes of the optimal spectrum division scheme.

As an optional implementation manner, step 101 may specifically include:

obtaining service distribution of guarantee bit rate GBR services in the first area and service distribution of GBR services in the second area of each base station among all the base stations covered by the pre-specified network within the preset period.

In this implementation manner, step 102 may specifically include:

calculating a ratio between the obtained total service distribution of GBR services in the first area of the network and total service distribution of GBR services in the second area of the network.

A multiple of the ratio is used as a spectrum division scheme for the first area and the second area, where a value of the multiple is a value in a set N, and values in the set N include i positive real numbers; in this way, i spectrum division schemes for the first area and the second area are obtained.

In this implementation manner, the obtained spectrum division scheme for the first area and the second area is specifically a multiple of the ratio between the obtained total service distribution of GBR services in the first area of the network and total service distribution of GBR services in the second area of the network.

As an optional implementation manner, specifically, this embodiment may be applied to a control device at a network side, where the control device may specifically be a device in a network element management system (network element management system, EMS) or a network management system (Network Management System, NMS).

Optionally, the base station may perform information transmission with the control device through an internal interface or a standard northbound interface of the control device. For example, in the obtaining the service distribution of the base station in step 101 and the sending the optimal spectrum division scheme and the optimal spectrum allocation scheme to the base station in step 103, specifically, information transmission may be performed with the base station through an internal interface or a standard northbound interface of the control device.

Optionally, the pre-specified network may also specifically be a network formed by all base stations controlled by the control device.

In the foregoing technical solution, service distribution in a first area and service distribution in a second area of each base station among all base stations covered by a pre-specified network within a preset period are obtained; i spectrum division schemes for a first area of the network and a second area of the network and h second area spectrum allocation schemes under each spectrum division scheme are formulated according to the obtained total service distribution in the first area of the network and total service distribution in the second area of the network; an optimal spectrum division scheme and an optimal second area spectrum allocation scheme of the optimal spectrum division scheme are selected; and the optimal spectrum division scheme and the optimal second area spectrum allocation scheme are sent to the base station, so that the base station allocates a spectrum of a first area and a second area of a cell according to the optimal spectrum division scheme and the optimal second area spectrum allocation scheme. In this way, spectrum division may change when service distribution changes, and is more suitable for a dynamic service, thereby improving a utilization rate of a spectrum resource, and at the same time, reducing interference between cells.

Figure 2:
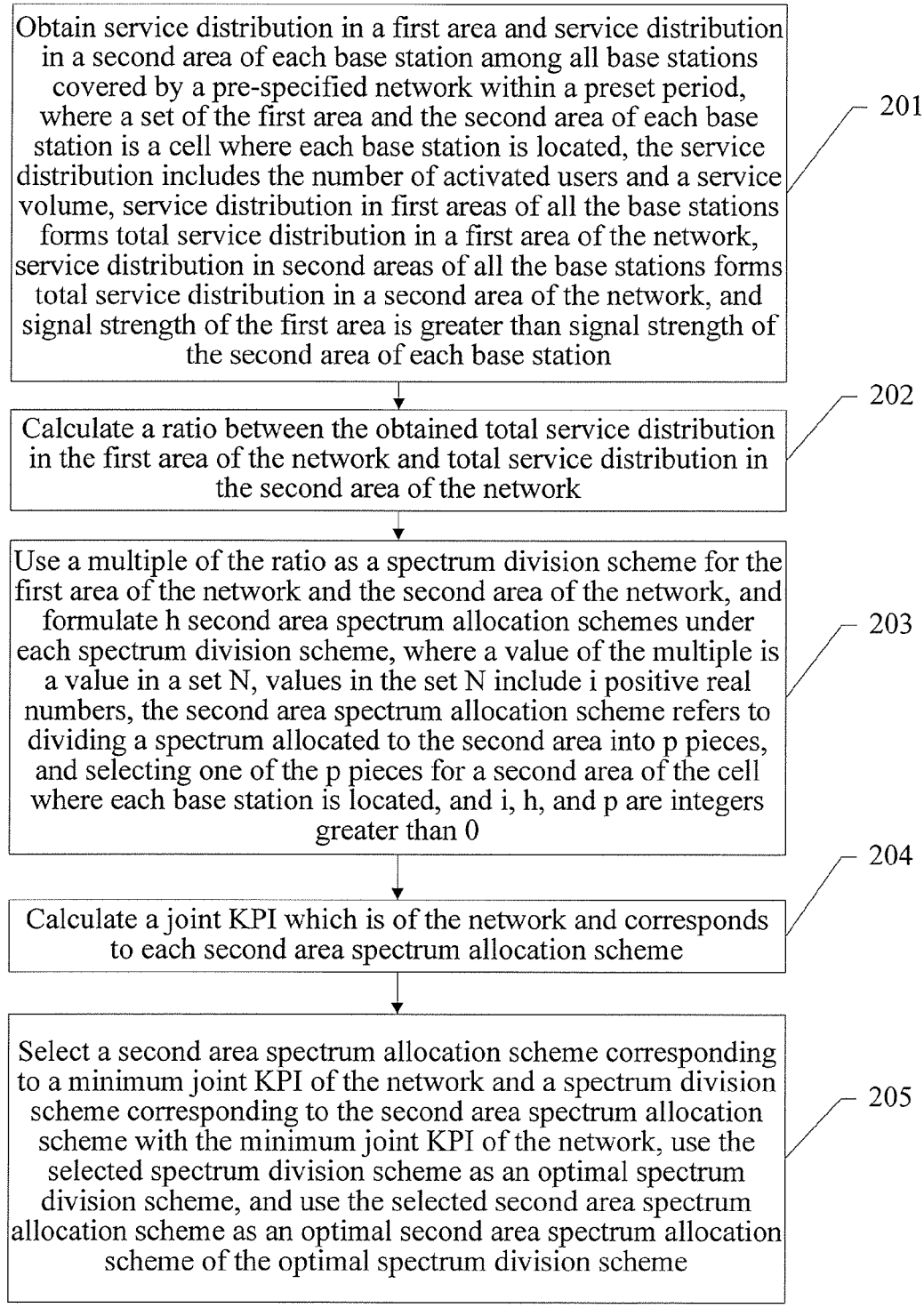
FIG. 2 is a schematic flow chart of another spectrum division method provided by an embodiment of the present invention.

FIG. 2 is a schematic flow chart of another spectrum division method provided by an embodiment of the present invention. As shown in FIG. 2, the method includes the following steps:

201: Obtain service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station.

Optionally, the service distribution in the second area received and obtained in step 201 may specifically be service distribution of all types of services in the second area, and at the same time, the second area is also service distribution of all types of services, including, for example, GBR services and NON-GBR services.

202: Calculate a ratio between the obtained total service distribution in the first area of the network and total service distribution in the second area of the network.

Optionally, the total service distribution in the first area of the network obtained in step 202 is specifically total service distribution of all types of services in the first areas of all the base stations, and similarly, it is the same in the second area.

203: Use a multiple of the ratio as a spectrum division scheme for the first area of the network and the second area of the network, and formulate h second area spectrum allocation schemes under each spectrum division scheme, where a value of the multiple is a value in a set N, values in the set N include i positive real numbers, the second area spectrum allocation scheme refers to dividing a spectrum allocated to the second area into p pieces, and selecting one of the p pieces for a second area of the cell where each base station is located, and i, h, and p are integers greater than 0.

Specifically, it may be that a multiple of the ratio calculated in step 202 may be used as a spectrum division scheme for the first area and the second area. The spectrum division scheme for the first area and the second area is specifically a spectrum division scheme for first areas and second areas of all cells covered by the pre-specified network; that is to say, spectrum division schemes for the first areas and the second areas of all the cells covered by the pre-specified network are the same.

204: Calculate a joint performance indicator (Key Performance Indicator, KPI) of the network corresponds to each second area spectrum allocation scheme.

Optionally, a joint KPI which is of the network and corresponds to each second area spectrum allocation scheme is calculated in step 204. When i is 5 and h is 4, the formulating h second area spectrum allocation schemes for each spectrum division scheme in step 203 means formulating 20 second area spectrum allocation schemes in step 203; then, joint KPIs which are of the network and correspond to the 20 second area spectrum allocation schemes are calculated in step 204 respectively.

As an optional implementation manner, the joint KPI of the network in step 204 may specifically include: a call dropping and blocking ratio (Call Dropping & Blocking Ratio, CDBR) of GBR services and a normalized throughput THP of non-guarantee bit rate services Non-GBR services of the network (in the present invention, THP may be used to represent the normalized throughput of Non-GBR services).

In this implementation manner, step 204 may specifically include:

calculating a CDBR which is of GBR services of the network and corresponds to each second area spectrum allocation scheme and a THP which is of Non-GBR services of the network and corresponds to each second area spectrum allocation scheme; and calculating a joint KPI which is of the network and corresponds to each second area spectrum allocation scheme through the following formula:

$$FF(b, \eta) = \left(CDBR + \lambda * \left(1 - \frac{THP}{AMBR}\right)\right)$$

where $FF(b,\eta)$ is the joint KPI of the network, AMBR is a constant of an aggregate maximum bit rate of Non-GBR services, and $\lambda$ satisfies that $0 < \lambda \leq 1$.

In this implementation manner, the CDBR which is of GBR services of the network and corresponds to each second area spectrum allocation scheme may specifically be calculated through the following formula:

$$CDBR(\overline{\rho}, MC) = \frac{\sum_{SC_i \in SC} \max(MC_i \cdot (1 - 1/\hat{\rho}_i), 0)}{\sum_{SC_i \in SC} MC_i}$$

where $SC_i$ is the first area or the second area, SC is a set of all $SC_i$ in the network, $MC_i$ and $\hat{\rho}_i$ are the number of activated users and an estimated load of GBR services in $SC_i$ respectively.

The THP which is of Non-GBR services of the network and corresponds to each second area spectrum allocation scheme may specifically be calculated through the following formulas:

$$THP(\overline{\rho}, T, b) = \sum_{SC_i \in SC} THP_i = \sum_{SC_i \in SC} k_i^{sch} \eta^{BW}(1-\rho_i)W_i f\left(\left(Q_i + \sum_{\tau \in I_i}\rho_\tau R_{i,\tau}\right)/N_i\right)$$

where $k_i^{sch}$ and $\eta_{BW}$ are coefficients corresponding to a scheduler, $\rho_i$ is a real load of GBR services in $SC_i$, and $\rho_i = \min(1, \hat{\rho}_i)$, $W_i$ is a bandwidth which is of an allocated spectrum of $SC_i$ and corresponds to the second area spectrum allocation scheme, $I_i$ is a set of areas that interfere with $SC_i$, $\rho_\tau$ is an estimated load of GBR services and Non-GBR services in an area $\tau$, $R_{i,\tau}$ is a spectrum utilization rate, and $N_i$ is the number of activated users of Non-GBR services in $SC_i$; and $$f(x) = \frac{\log(2)}{\ln(1+1/x)},$$

$$Q_i = \frac{P^{noise}}{\eta^{SINR}} \sum_{p \in SC_i} \frac{T(p)}{P_{p,i}};$$

where $P^{noise}$ is a noise volume, $\eta^{SINR}$ is a coefficient corresponding to a scheduler, $T(p)$ is the number of activated users of Non-GBR services at a pixel pi in $SC_i$, $P_{p,i}$ is receiving power at the pixel pi, the first area includes several pixels, the second area includes several pixels, and the pixel pi is a pixel in the first area or the second area.

In this implementation manner, before the calculating a CDBR which is of GBR services of the network and corresponds to each second area spectrum allocation scheme, the method may further include:

calculating an estimated load which is of GBR services in the first area and corresponds to each second area spectrum allocation scheme and an estimated load which is of GBR services in the second area and corresponds to each second area spectrum allocation scheme through the following formulas respectively:

$$\hat{\rho}_i \leq \frac{G_i}{W_i} f\left(\frac{N_i}{G_i} + \sum_{i' \in I_i} \frac{H_{i,i'} \min(\hat{\rho}_{i'}, 1)}{G_i}\right)$$

where $\hat{\rho}_i$ is an estimated load of GBR services in a subarea i, the subarea is the first area or the second area, and $I_i$ is a set of subareas that interfere with the subarea i; and $$f(x) = \frac{\log(2)}{\ln(1+1/x)}$$

$$G_i = \sum_{s \in S} \sum_{p \in SC_i} \frac{T_{s,p}D_s}{k_i^{sch}\eta^{BW}}$$

$$N_i = \sum_{s \in S} \sum_{p \in SC_i} \frac{T_{s,p}D_s \eta^{SINR} P^n}{k_i^{sch}\eta^{BW} P_i g_{i,p}}$$

$$H_{i,i'} = \sum_{s \in S} \sum_{p \in SC_i} \frac{T_{s,p}D_s \eta^{SINR} P_{i'} g_{i',p}}{k_i^{sch}\eta^{BW} P_i g_{i,p}}$$

where $P_i$ and $P_{i'}$ are transmit power of the subarea i and a subarea i' respectively, $g_{i,p}$ and $g_{i',p}$ are a channel gain from a base station to which the subarea i belongs to the pixel pi and a channel gain from a base station to which a neighboring subarea of the subarea i' belongs to the pixel pi respectively, the subarea i' is a neighboring subarea of the subarea i, $D_s$ is a data rate required by a service s among GBR services, $T_{s,p}$ is the number of activated users at the pixel pi in the subarea i, $T_{s,p}D_s$ represents service distribution of the service s at the pixel pi, and S represents a set of all services of GBR services.

As an optional implementation manner, the obtaining service distribution in a first area and service distribution in a second area of each base station among all base stations covered by a pre-specified network within a preset period in step 201 may specifically include:

obtaining service distribution at each pixel in the first area and service distribution at each pixel in the second area of each base station among all the base stations covered by the pre-specified network within the preset period; an estimated load of the subarea calculated in this way is more precise.

$W_i$, namely, a spectrum of the subarea, exists in the foregoing formula; therefore, an estimated load of GBR services in the subarea calculated based on a different $W_i$ varies. $W_i$ is decided by the spectrum division scheme, that is, a different $W_i$ is obtained in a different spectrum division scheme, thereby obtaining estimated loads which are of GBR services in different subareas and correspond to different spectrum division schemes. The CDBR of GBR services and the THP of Non-GBR services in the subarea are calculated based on the estimated load of GBR services in the subarea, and the joint KPI of the network is calculated based on CDBRs of GBR services and THPs of Non-GBR services in all subareas; in this way, different joint KPIs which are of the network and correspond to different spectrum division schemes may be obtained.

As an optional implementation manner, the THP which is of Non-GBR services of the network and corresponds to each second area spectrum allocation scheme may be calculated through the following formula:

$$THP(\bar{p}, T, b) = \sum_{SC_i \in SC} THP_i = \sum_{SC_i \in SC} k_i^{sch} \eta^{BW} (1 - \rho_i) W_i \sum_{p \in SC_i} T(p) R_p(\tilde{p})$$

where $k_i^{sch}$ and $\eta^{BW}$ are coefficients corresponding to a scheduler, $\rho_i$ is a real load of GBR services in $SC_i$, $\tilde{\rho}$ is a real load of GBR services and Non-GBR services in $SC_i$, and $\rho_i = \min(1, \hat{\rho}_i)$, and $W_i$ is a bandwidth which is of an allocated spectrum of $SC_i$ and corresponds to the second area spectrum allocation scheme.

It should be noted that, through the foregoing method for calculating $\rho_i$, $\tilde{\rho}$ may be calculated, that is, the real load of GBR services and Non-GBR services in $SC_i$ is calculated.

Optionally, $f(x)$ is a convex function, and in a condition that $z1, \ldots zn > 0$ and $\epsilon 1, \ldots, \epsilon n > 0$, $\epsilon 1 + \ldots + \epsilon n = 1$, the function satisfies that:

$$f(\epsilon_1 z_1 + \ldots + \epsilon_n z_n) \leq \epsilon_1 f(z_1) + \ldots + f(z_n)$$

Then, the THP of NON-GBR services in the subarea may be calculated through the following formula:

$$THP_i \geq k_i^{sch} \eta^{BW} (1 - \rho_i) W_i f\left(\left(Q_i + \sum_{\tau \in I_i} \tilde{\rho}_\tau R_{i,\tau}\right) / N_i\right)$$

where THP i is the THP of NON-GBR services in the subarea, and $\tilde{\rho}_\tau$ is a real load of GBR services and Non-GBR services in an area $\tau$.

$P_i$ and $P_{i'}$ are transmit power of a subarea SC and a subarea $SC_{i'}$, respectively, $SC_{i'}$ is a neighboring subarea of the subarea SC, and $g_{i,p}$ and $g_{i',p}$ are a channel gain from a base station to which the subarea SC belongs to the pixel pi and a channel gain from a base station to which the neighboring subarea of the subarea SC belongs to the pixel pi.

In this case, the THP of NON-GBR services in the subarea is conservatively estimated as follows:

$$THP(\bar{p}, T, b) = \sum_{SC_i \in SC} THP_i = \sum_{SC_i \in SC} k_i^{sch} \eta^{BW} (1 - \rho_i) W_i f\left(\left(Q_i + \sum_{\tau \in I_i} \tilde{\rho}_\tau R_{i,\tau}\right) / N_i\right)$$

Therefore, it is implemented that the THP of NON-GBR services in the subarea is calculated based on the estimated load of GBR services in the subarea.

It should be noted that, the subarea may specifically be the first area or the second area.

A joint network performance indicator KPI corresponding to the second area spectrum allocation scheme may be obtained through the foregoing calculation method.

205: Select a second area spectrum allocation scheme corresponding to a minimum joint KPI of the network and a spectrum division scheme corresponding to the second area spectrum allocation scheme with the minimum joint KPI of the network, use the selected spectrum division scheme as an optimal spectrum division scheme, and use the selected second area spectrum allocation scheme as an optimal second area spectrum allocation scheme of the optimal spectrum division scheme.

As an optional implementation manner, the calculating a joint KPI which is of the network and corresponds to each second area spectrum allocation scheme in step 204 and the selecting a second area spectrum allocation scheme corresponding to a minimum joint KPI of the network and a spectrum division scheme corresponding to the second area spectrum allocation scheme with the minimum joint KPI of the network in step 205 may specifically be performed at the same time. Specifically, by performing a genetic algorithm, a joint network performance indicator KPI corresponding to the second area spectrum allocation scheme may be obtained, and a second area spectrum allocation scheme corresponding to a minimum joint KPI of the network and a spectrum division scheme corresponding to the second area spectrum allocation scheme with the minimum joint KPI of the network may be selected.

Optionally, a calculation process of the genetic algorithm is as follows:

storing individuals of a current generation, where the individuals of the current generation include h second area spectrum allocation schemes of a candidate spectrum division scheme corresponding to a current operation;

calculating a joint KPI which is of the network and corresponds to each individual of the current generation;

selecting an individual with a minimum joint KPI of the network as a high-quality individual;

selecting several individuals of the current generation for combination, to generate a combined individual;

selecting several individuals of the current generation for random disturbance, to generate a mutated individual; and forming the high-quality individual, the combined individual, and the mutated individual into a second generation, and performing the step of storing individuals of the current generation cyclically until an optimal second area spectrum allocation scheme of the candidate spectrum division scheme corresponding to the current operation is selected.

An optimal second area spectrum allocation scheme of a spectrum division scheme is obtained each time the genetic algorithm is run, where the optimal second area spectrum allocation scheme is a second area spectrum allocation scheme with a minimum joint KPI of the network among h second area spectrum allocation schemes of the spectrum division scheme corresponding to the current genetic algorithm. When there are i spectrum division schemes, the genetic algorithm is run for i times. In this way, an optimal second area spectrum allocation scheme of each spectrum division scheme may be obtained, and specifically, i second area spectrum allocation schemes are obtained; and then a second area spectrum allocation scheme with a minimum joint KPI of the network is selected from the i second area spectrum allocation schemes. The second area spectrum allocation scheme obtained in this manner is the optimal second area spectrum allocation scheme obtained in step 205.

As an optional implementation manner, see Table 1 for a pseudo-code list of the foregoing genetic algorithm. See Table 2 for a pseudo-code list of a crossover function Crossover. See Table 3 for a pseudo-code list of a mutation function Mutation.

TABLE 1

Pseudo-code list of a genetic algorithm for
calculating an optimal scheme of spectrum division
Algorithm 1. Acquisition of an optimal scheme of spectrum division Input:
    Fitness functions and parameters $G_i$, $N_i$, $H_{i,i'}$ of RLP problem;
Output:
    Band assignment $b = (b_1,...,b_C)$;
1: Initialize($P_0$);
//randomly initialize individuals of an initial generation
2: t = 0;
3: while Termination($P_t$)
4:    Evaluate($P_t$);
//calculate fitness of the individuals of the initial generation
5:    $P_t^{elite}$ = Elitism($P_t$);
6:    $P_t'$ = Selection($P_t$);
// randomly select, according to levels and intensity of the individuals of the initial generation, an individual of the initial generation for breeding
7:    $P_t^{xover}$ = Crossover($P_t'$); //Load-based Crossover
// perform a crossover operation on individuals in $P_t' =$
8:    $P_t^{mutation}$ = Mutation($P_t'$); //Hybrid Mutation
//perform a mutation operation on individuals in $P_{t+1}'$
//9:    $P_{t+1} = [P_t^{elite} P_t^{xover} P_t^{mutation}]$;
generate a next generation
10:    t = t + 1;
11: end
12: return b = BestSolution($P_0$,...$P_t$);

TABLE 2

Pseudo-code list of a Crossover function
Algorithm 2. Load-based crossover

Input: parent spectrum allocation schemes $b' = (b'_1,...,b'_C)$, $b'' = (b''_1,...,b''_C)$, where $C = |SC_{outer}|$, which is the number of outer areas of the whole network; corresponding loads $\rho' = (\rho_1',...,\rho_C')$, $\rho'' = (\rho_1'',...,\rho_C'')$, $H_{\alpha,\alpha'}$ parameter, and the mean number of adjacent individuals $\alpha$.
Output: second generation spectrum allocation schemes $b = (b_1,...,b_C)$ generated through crossover
1: d: $\rho_d' - \rho_d'' = \min(\rho_1' - \rho_1'',...,\rho_C' - \rho_C'')$
// find an outer area d in which load performance of two spectrum allocation schemes b' and b'' is closest to each other
2: b = b''
3: $b_d = b_d'$
// a child individual b inherits spectrum allocation other than that in the outer area d from a parent individual b', and inherits a spectrum of the outer area d from a parent individual b''
4: K = max(min($\alpha$ + randn,C),1)
//the child individual inherits spectra of K cells around the cell d from the parent individual b', where K is generally a random variable with a mean value being $\alpha$
5: $N_d \subset SC_{outer}$ : $|N_d| = K, H_{d,n}.\min(\rho_n,1) \geq H_{d,m}.\min(\rho_m,1)$, $\forall n \in N_d, \forall m \in SC_{outer} \setminus \{N_d\}$ TABLE 2-continued Pseudo-code list of a Crossover function
Algorithm 2. Load-based crossover // determine K neighboring outer areas that generate greatest interference on the outer area d
6: for n = $N_d$
7:    $b_n = b'_n$
8: end
9: return b

TABLE 3

Pseudo-code list of a Mutation function
Algorithm 3. Hybrid mutation

Input: parent spectrum allocation schemes $b' = (b_1',...,b_C')$ and corresponding loads $(\rho_1',...,\rho_C')$, a utility function $FF(b,\eta_i)$, a ratio of outer areas that generate mutation $0 \leq \beta \leq 1$, and a local search parameter $0 \leq \gamma \leq 1$
Output: child spectrum allocation schemes $b = (b_1,...,b_C)$
1: if $\gamma$ + rand > 1
// if the condition is satisfied, perform a local search
2:    b = b'
// initialize a child individual by using a parent individual
3:    $s_1,...,s_C$ = sort($\rho'_1,...,\rho'_C$)
// sequence all outer areas in descending order
4:    for c = $s_1,...,s_C$
// traverse the outer areas starting from an outer area with a greatest load
5:        for $b_c$ = 1,...,B
6:            $f_{b_c}$ = FF ($b,\eta_i$)
// traverse all frequency bands for an outer area c
7:        end
8:        $b_c : f_{b_c} = \min(f_1,...,f_B)$
// the outer area c is granted a spectrum with optimal fitness
9:    end
10: else
// random mutation
11:    for c = 1,...,C
12:        if rand > $\beta$
13:            $b_c$ = randi(B)
14:        end
15:    end
16: end
17: return b As an optional implementation manner, after the selecting an optimal spectrum division scheme and an optimal second area spectrum allocation scheme under the optimal spectrum division scheme in step 205, and before the sending the optimal spectrum division scheme and the optimal second area spectrum allocation scheme to the base station, the method further includes:

determining whether the joint KPI which is of the network and corresponds to the optimal second area spectrum allocation scheme is greater than a current joint KPI of the network, and if yes, sending the optimal spectrum division scheme and the optimal second area spectrum allocation scheme to the base station.

In this way, it can be ensured that the joint KPI which is of the network and corresponds to the optimal spectrum division scheme and the optimal second area spectrum allocation scheme which are sent to the base station is greater than the current joint KPI of the network, thereby providing a utilization rate of a spectrum resource.

In the foregoing technical solution, an optimal second area spectrum allocation scheme with a minimum joint KPI of a network and an optimal spectrum division scheme corresponding to the optimal second area spectrum allocation scheme may be selected, and the selected optimal second area spectrum allocation scheme and optimal spectrum division scheme are sent to a base station. In this way, the base station allocates a spectrum of a cell to a first area of the base station and a second area of the base station according to the optimal spectrum division scheme, and then selects, according to the optimal second area spectrum allocation scheme, one piece of the spectrum allocated to the second area; a network KPI corresponding to the optimal second area spectrum allocation scheme of the optimal spectrum division scheme is minimum, and therefore, a utilization rate of a spectrum resource may be improved.

Figure 3:
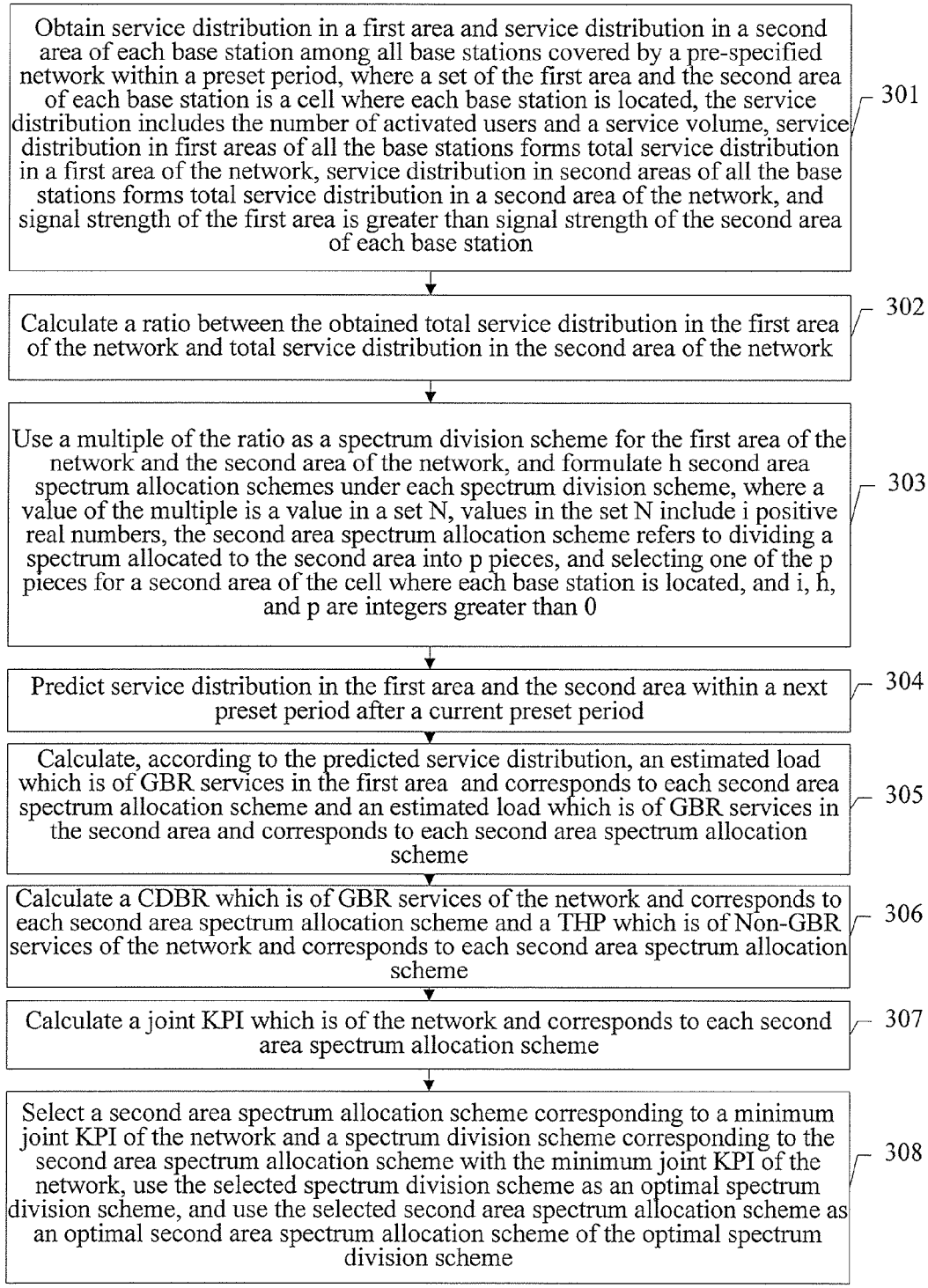
FIG. 3 is a schematic flow chart of another spectrum division method provided by an embodiment of the present invention.

FIG. 3 is a schematic flow chart of another spectrum division method provided by an embodiment of the present invention. As shown in FIG. 3, the method includes the following steps:

301: Obtain service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station.

302: Calculate a ratio between the obtained total service distribution in the first area of the network and total service distribution in the second area of the network.

303: Use a multiple of the ratio as a spectrum division scheme for the first area of the network and the second area of the network, and formulate h second area spectrum allocation schemes under each spectrum division scheme, where a value of the multiple is a value in a set N, values in the set N include i positive real numbers, the second area spectrum allocation scheme refers to dividing a spectrum allocated to the second area into p pieces, and selecting one of the p pieces for a second area of the cell where each base station is located, and i, h, and p are integers greater than 0.

304: Predict service distribution in the first area and the second area within a next preset period of a current preset period, where the current preset period refers to the preset period in step 301.

As an optional implementation manner, the service distribution in the first area and the second area in the next preset period may be predicted through the following formula:

$$L_t = \zeta \cdot (x_t \cdot I_{t-d}) + (1-\zeta) \cdot L_{t-1}$$

$$I_t = \delta \cdot (x_t - L_t) + (1-\delta) \cdot I_{t-d}$$

$$\hat{x}_{t+h} = L_t + I_{t-d+h \bmod d}$$

where t is the current preset period; $L_t$ is a mean value part which is of the number of activated users of GBR services at a pixel pi and is calculated according to the number of activated users of GBR services at the pixel pi within t and a preset period before t; $I_t$ is a period part which is of the number of activated users of GBR services at the pixel pi and is calculated according to the number of activated users of GBR services at the pixel pi within t and a preset period before t; d is a period of time series of the number of activated users of the GBR services; $x_t$ is the number of activated users of GBR services at the pixel pi within t; $0 \leq \zeta \leq 1$ and $0 \leq \delta \leq 1$ are parameters for controlling smoothness; $\hat{x}_{t+h}$ is the number of activated users of GBR services at the pixel within the next preset period, and a value of h is 1.

In this implementation manner, the obtaining service distribution in a first area and service distribution in a second area of each base station among all base stations covered by a pre-specified network within a preset period in step 301 may specifically include:

obtaining service distribution at each pixel in the first area and service distribution at each pixel in the second area of each base station among all the base stations covered by the pre-specified network within the preset period; in this way, service distribution at all pixels covered by the network may be calculated through the foregoing formula in step 304, so that an estimated load calculated in step 305 is more precise.

305: Calculate, according to the predicted service distribution, an estimated load which is of GBR services in the first area and corresponds to each second area spectrum allocation scheme and an estimated load which is of GBR services in the second area and corresponds to each second area spectrum allocation scheme.

Optionally, for the calculating an estimated load of GBR services in the first area and an estimated load of GBR services in the second area in step 305, reference may specifically be made to the calculation manner provided in the foregoing embodiment.

306: Calculate a CDBR which is of GBR services of the network and corresponds to each second area spectrum allocation scheme and a THP which is of Non-GBR services of the network and corresponds to each second area spectrum allocation scheme.

Optionally, the CDBR which is of GBR services of the network and corresponds to each second area spectrum allocation scheme and the THP which is of Non-GBR services of the network and corresponds to each second area spectrum allocation scheme are specifically calculated according to the estimated load which is of GBR services in the first area and corresponds to the second area spectrum allocation scheme and the estimated load which is of GBR services in the second area and corresponds to the second area spectrum allocation scheme.

For a specific calculation process, reference may be made to the calculation manner provided in the foregoing embodiment.

307: Calculate a joint KPI which is of the network and corresponds to each second area spectrum allocation scheme through the following formula:

$$FF(b, \eta) = \left(CDBR + \lambda * 1\left(1 - \frac{THP}{AMBR}\right)\right)$$

where $FF_{(b,\eta)}$ is the joint KPI of the network, AMBR is a constant of an aggregate maximum bit rate of Non-GBR services.

308: Select a second area spectrum allocation scheme corresponding to a minimum joint KPI of the network and a spectrum division scheme corresponding to the second area spectrum allocation scheme with the minimum joint KPI of the network, use the selected spectrum division scheme as an optimal spectrum division scheme, and use the selected second area spectrum allocation scheme as an optimal second area spectrum allocation scheme of the optimal spectrum division scheme.

In the foregoing technical solution, it may be implemented that service distribution in a first area and a second area within a next preset period of a current preset period is predicted, an estimated load which is of GBR services in the first area and corresponds to each second area spectrum allocation scheme and an estimated load which is of GBR services in the second area and corresponds to each second area spectrum allocation scheme are calculated according to the predicted service distribution, and then a joint KPI which is of a network and corresponds to each second area spectrum allocation scheme is calculated, so as to select a second area spectrum allocation scheme corresponding to a minimum joint KPI of the network and a spectrum division scheme corresponding to the second area spectrum allocation scheme with the minimum joint KPI of the network, and use the selected spectrum division scheme as an optimal spectrum division scheme. In this way, a utilization rate of a spectrum resource may be improved.

Figure 4:
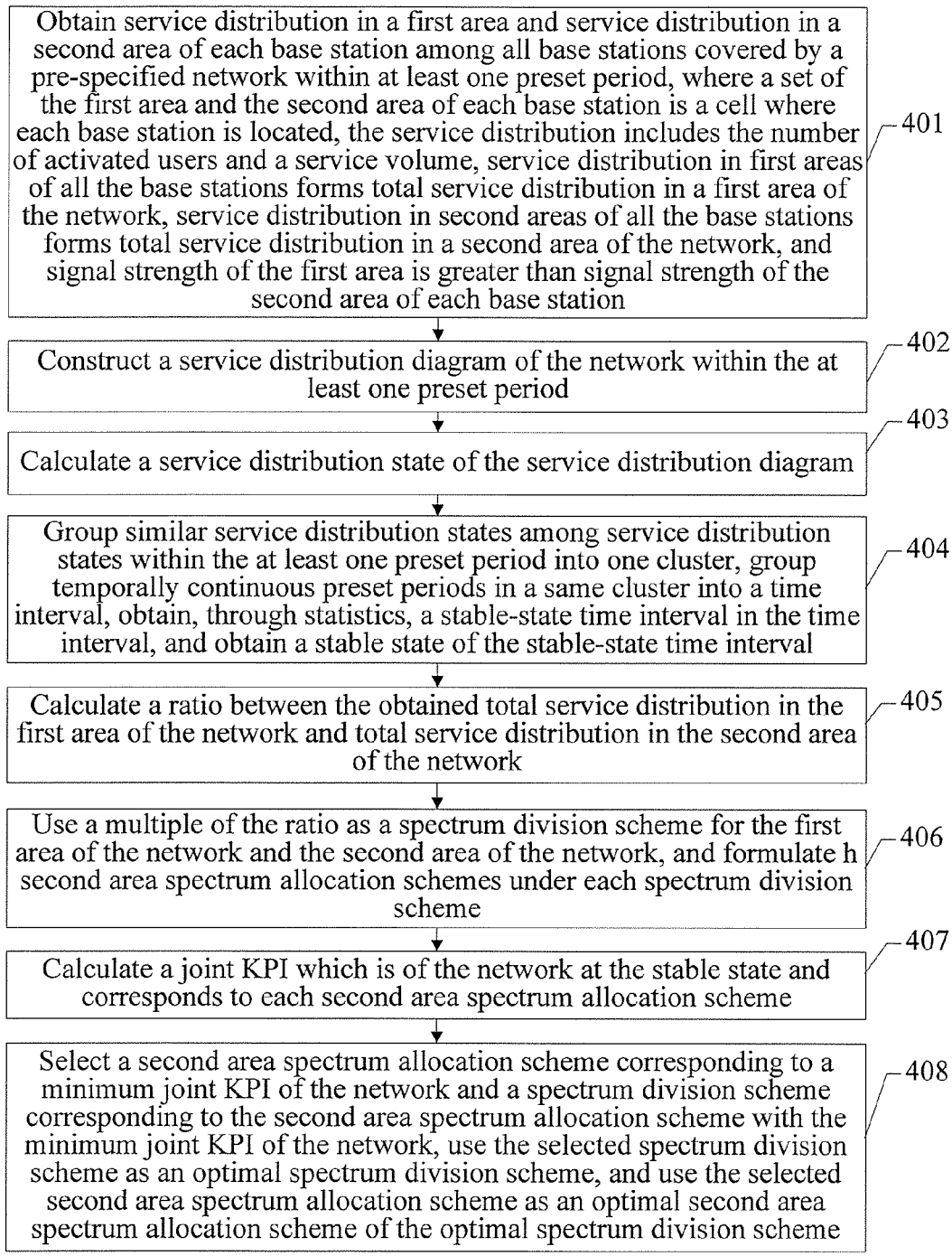
FIG. 4 is a schematic flow chart of another spectrum division method provided by an embodiment of the present invention.

FIG. 4 is a schematic flow chart of another spectrum division method provided by an embodiment of the present invention. As shown in FIG. 4, the method includes the following steps:

401: Obtain service distribution in a first area and service distribution in a second area of each base station among all base stations covered by a pre-specified network within at least one preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station.

402: Construct a service distribution diagram of the network within the at least one preset period.

Optionally, it may specifically be that a service distribution diagram within each preset period is constructed, where the service distribution diagram may specifically be converted from the service volume in the service distribution.

As an optional implementation manner, step 402 may specifically include:

constructing service distribution matrices of each first area and each second area within the preset period respectively through the following formula:

$$\text{Abs}(F)=(a_1 S_1^2 + \ldots a_k S_k^2)^{0.5}, (x,y) \to R$$

where $S_1 \ldots S_k$ are service volumes of k service types existing in a subarea, and $a_1 \ldots a_k$ are weights corresponding to the k service types; $S_1 \ldots S_k$ are service volumes of k service types existing in the subarea, and $a_1 \ldots a_k$ are weights corresponding to the k service types, and are a constant.

Euclidean norm transformation is performed on the service distribution matrices of each first area and each second area within the period respectively, so as to obtain a service distribution diagram of the network within the period. It may specifically be that, within each preset period, a service distribution diagram is obtained. In this way, a service volume within one preset period may be represented by one service distribution diagram, which facilitates subsequent calculation.

Optionally, the constructing a service distribution matrix may specifically be constructing a service distribution matrix of each pixel within each preset period through the foregoing formula, and Euclidean norm transformation may specifically be performed on the service distribution matrix of each pixel, so as to obtain a service distribution diagram of the network within each period.

Certainly, in the present invention, the method for calculating a service distribution diagram within each preset period includes, but is not limited to, the foregoing method.

403: Calculate a service distribution state of the service distribution diagram.

It may specifically be that a service distribution state of each service distribution diagram is calculated, and the service distribution state may specifically be converted from the service distribution diagram constructed in step 402, and the service distribution state may specifically be a numerical value.

As an optional implementation manner, step 403 may specifically include:

mapping each service distribution diagram to specific signal space, so as to obtain the service distribution state of the service distribution diagram, where the service distribution state of the service distribution diagram includes:

$$Z(F)=\|\text{Conv}(\text{Abs}(f))\|_{euc}$$

Conv(F) is a convolution of Abs(F) and a two-dimensional Gaussian kernel function $G_\sigma(x,y)$.

Optionally, the specific signal space may specifically be signal space represented by the following formula:

$$\text{Conv}(F)=\int_{z\in(-\infty,\infty)}\int_{w\in(-\infty,\infty)} F(x-z,y-w) G_\sigma(z,w) d_z d_w$$

That is, Conv(F) is a convolution of $F=(x,y)$ and a two-dimensional Gaussian kernel function $G_\sigma=(x,y)$.

$F=(x,y)$ is a service distribution matrix defined in a domain of $x\in[0,M]$ and $y\in[0,N]$, and all other values out of the domain of definition are 0.

F is defined at discrete points, so the present invention adopts a discrete manner of this operation, namely:

$$\text{Conv}(F)=\Sigma_{z\in(-\infty,\infty)}\Sigma_{w\in(-\infty,\infty)} F(x-z,y-w) T(z,\sigma) T(w,\sigma)$$

where $T(z,\sigma)=e^{-\sigma}I_z(\sigma)$, and $I_z(\sigma)$ is a modified Bessel (Bessel) function of finite order.

Therefore, the service distribution state of the service distribution diagram may be obtained through the following formula:

$$Z(F)=\|\text{Conv}(\text{Abs}(f))\|_{euc}$$

Optionally, a service distribution diagram difference between two service distribution diagrams may be calculated through the following formula, and specifically one service distribution state is obtained:

$$\rho(v,w)=\|z-w\|=\|\text{Conv}(\text{Abs}(F_v))-\text{Conv}(\text{Abs}(F_w))\|_{euc}.$$

Therefore, each service distribution diagram may be represented by a service distribution state, and at the same time, a difference between two service distribution diagrams may also be represented by a service distribution state. Certainly, in the present invention, the method for calculating a service distribution state within each preset period includes, but is not limited to, the foregoing method.

404: Group similar service distribution states among service distribution states within the at least one preset period into one cluster, group temporally continuous preset periods in a same cluster into a time interval, obtain, through statistics, a stable-state time interval in the time interval, and obtain a stable state of the stable-state time interval, where the stable state is a mean value of all service distribution states within the stable-state time interval, and the stable-state time interval refers to a sub-time interval [a',b'] satisfying the following conditions:

$$a'=\min\{t\in[a,b]:\rho(v_t,E_{[a,b]})>\text{SST}\times\rho(v_t,E_{[c,a-1]})\}$$

$$b'=\min\{t\in[a,b]:\rho(v_t,E_{[a,b]})>\text{SST}\times\rho(v_t,E_{[b+1,d]})\},$$

$$a'<b';$$

where SST is a preset constant, [a',b'] is a sub-time interval, [a,b] is a time interval where [a',b'] is located, [c,a−1]

and [b+1,d] are adjacent time intervals before and after [a,b] respectively, ρ(f) is a difference value between a service distribution state within a time interval and a mean value of all service distribution states within the time interval, $v_t$ is a service distribution state within [a,b], and $E_{[a,b]}$ is a mean value of all service distribution states within [a,b].

Optionally, each service distribution state specifically is a service distribution state of the network within a preset period. Therefore, each service distribution state has a time value, and more than two temporally continuous service distribution states may be regarded as a time interval.

As an optional implementation manner, step 404 may specifically include:

(1) getting the number of clusters k, where k=2;

(2) evenly distributing the service distribution states within the at least one preset period to the k clusters randomly;

(3) traversing each cluster, and calculating a mean value of all service distribution states within each cluster;

(4) traversing the service distribution state within each preset period, and grouping service distribution states which are of the preset periods and whose difference values with the mean value are within a certain range into a cluster, to generate a new clustering result;

(5) performing steps (3)-(4) repeatedly until the newly generated clustering result does not change any more;

(6) calculating a sum of central difference values of all clusters, where the central difference value refers to a difference value between a service distribution state of each preset period in the cluster and the mean value of the cluster;

(7) performing steps (2)-(6) repeatedly for a specified number of times, and selecting a clustering result whose sum of central difference values of all clusters is minimum;

(8) grouping temporally continuous preset periods in each cluster of the minimum clustering result obtained through statistics into a time interval, and obtaining, through statistics, a stable-state time interval in the time interval, where a mean value of service distribution states in the stable-state time interval forms a stable state;

(9) calculating a local minimal value through the following formula:

$$SSIndex(cl) = \frac{k \times DDS(cl)}{NSS^2}$$

$$DSS(cl) = \sum_{j=1\ldots m} \sum_{i \in [s_j, f_j]} \rho(v_i, E_j)^2$$

$$NSS = (f_1 - S_1 + 1) + \ldots + (f_m - S_m + 1)$$

where SSIndex(cl) is the local minimal value, $[s_1,f_1] \ldots [s_m,f_m]$ are stable-state time intervals identified in step (8), Ej is a mean value of all service distribution states in a stable-state time interval j identified in step (8);

(10) making k=k+1, and performing steps (2)-(9) repeatedly until k=$k_0$, where k0 is an integer greater than 1; and

(11) selecting a minimum local minimal value from multiple local minimal values calculated by performing step (9) repeatedly, and obtaining a stable-state time interval and a stable state in each cluster which are obtained through statistics in step (8) and correspond to the minimum local minimal value.

Optionally, a sum of central difference values of all clusters may specifically be calculated through the following formula in step (6):

$$D(cl) = \Sigma_{j=1,\ldots k} \Sigma_{j \in C_t} \rho(v_i, E_t)^2$$

where D(cl) is a sum of central difference values of all clusters, j is a cluster, k is the number of clusters, Ct is a cluster t, ρ(v,w)=∥z−w∥ is a difference value between a service distribution state within each preset period in the cluster t and the mean value of the cluster; $E_t$ is the mean value of the cluster; specifically, a central difference value of each cluster may be obtained through $\Sigma_{j \in C_t} \rho(v_i, E_t)^2$ and then a sum of central difference values of all clusters is calculated through $\Sigma_{j=1,\ldots k}$.

405: Calculate a ratio between the obtained total service distribution in the first area of the network and total service distribution in the second area of the network.

As an optional implementation manner, step 405 may specifically be calculating a ratio between the obtained total service distribution of GBR services in the first area at the stable state and total service distribution of GBR services in the second area at the stable state.

Optionally, the ratio between the obtained total service distribution of GBR services in the first area at the stable state and total service distribution of GBR services in the second area at the stable state may specifically be calculated through the following formula:

$$\Psi = \frac{\sum_{ss \in SS} \sum_{p \in SC_{inner}} T_{s,p} D_s}{\sum_{ss \in SS} \sum_{p \in SC_{Outer}} T_{s,p} D_s}$$

where Ψ is the ratio, ss is a stable state ss, SS is a set of stable states, $SC_{first}$ and $SC_{second}$ are a set of first areas and a set of second areas respectively, $SC_{first} \cap SC_{second} = SC$, SC is a set of the first areas and the second areas, $T_{s,p}$ is the number of activated users of GBR services at a pixel pi at the stable state ss, $D_s$ is a data rate required by GBR services, and $T_{s,p} D_s$ is a service volume of GBR services at the pixel pi at the stable state ss.

406: Use a multiple of the ratio as a spectrum division scheme for the first area of the network and the second area of the network, and formulate h second area spectrum allocation schemes under each spectrum division scheme, where a value of the multiple is a value in a set N, values in the set N include i positive real numbers, the second area spectrum allocation scheme refers to dividing a spectrum allocated to the second area into p pieces, and selecting one of the p pieces for a second area of the cell where each base station is located, and i, h, and p are integers greater than 0.

407: Calculate a joint KPI which is of the network at the stable state and corresponds to each second area spectrum allocation scheme.

Optionally, the joint KPI which is of the network at the stable state and corresponds to a second area spectrum allocation scheme may specifically be calculated through the following formula:

$$FF(b, \eta) = $$

$$\sum_{ss \in SS} T_{ss} FF_{ss}(b, \eta) = \sum_{ss \in SS} \left( TT_{ss} \sum_{SC_i \in SC} \left( CDBR_{ss,i} + \lambda * \left(1 - \frac{THP_{ss,i}}{AMBR_i}\right) \right) \right)$$

where FF(b,η) is a joint KPI of the network at the stable state, ss is a stable state ss, SS is a set of stable states, $T_{ss}$ is a duration of the stable state ss, $FF_{ss}$=(b,η) is a joint KPI of the network at the stable state ss, $SC_i$ is a subarea SCi, $SC_i$ is the first area or the second area, SC is a set of all $SC_i$ in the network; $CDBR_i$ is a CDBR of GBR services in $SC_i$ at the stable state ss, $THP_i$ is a THP of Non-GBR services in $SC_i$ at the stable state ss, $AMBR_i$ is a constant of an aggregate maximum bit rate of Non-GBR services in $SC_i$.

For a method for calculating $FF_{ss}(b,\eta)$ reference may be made to the calculation method provided in the foregoing embodiment.

408: Select a second area spectrum allocation scheme corresponding to a minimum joint KPI of the network and a spectrum division scheme corresponding to the second area spectrum allocation scheme with the minimum joint KPI of the network, use the selected spectrum division scheme as an optimal spectrum division scheme, and use the selected second area spectrum allocation scheme as an optimal second area spectrum allocation scheme of the optimal spectrum division scheme.

In the foregoing technical solution, it may be implemented that a joint network performance KPI which is at a stable state and corresponds to a second area spectrum allocation scheme is calculated; because a change of a service at the stable state is stable, an optimal spectrum division scheme and an optimal second area spectrum allocation scheme which are selected in this manner are more suitable for spectrum division of a cell, thereby improving a utilization rate of a spectrum of the cell, and at the same time, reducing a cost for spectrum adjustment.

Figure 5:
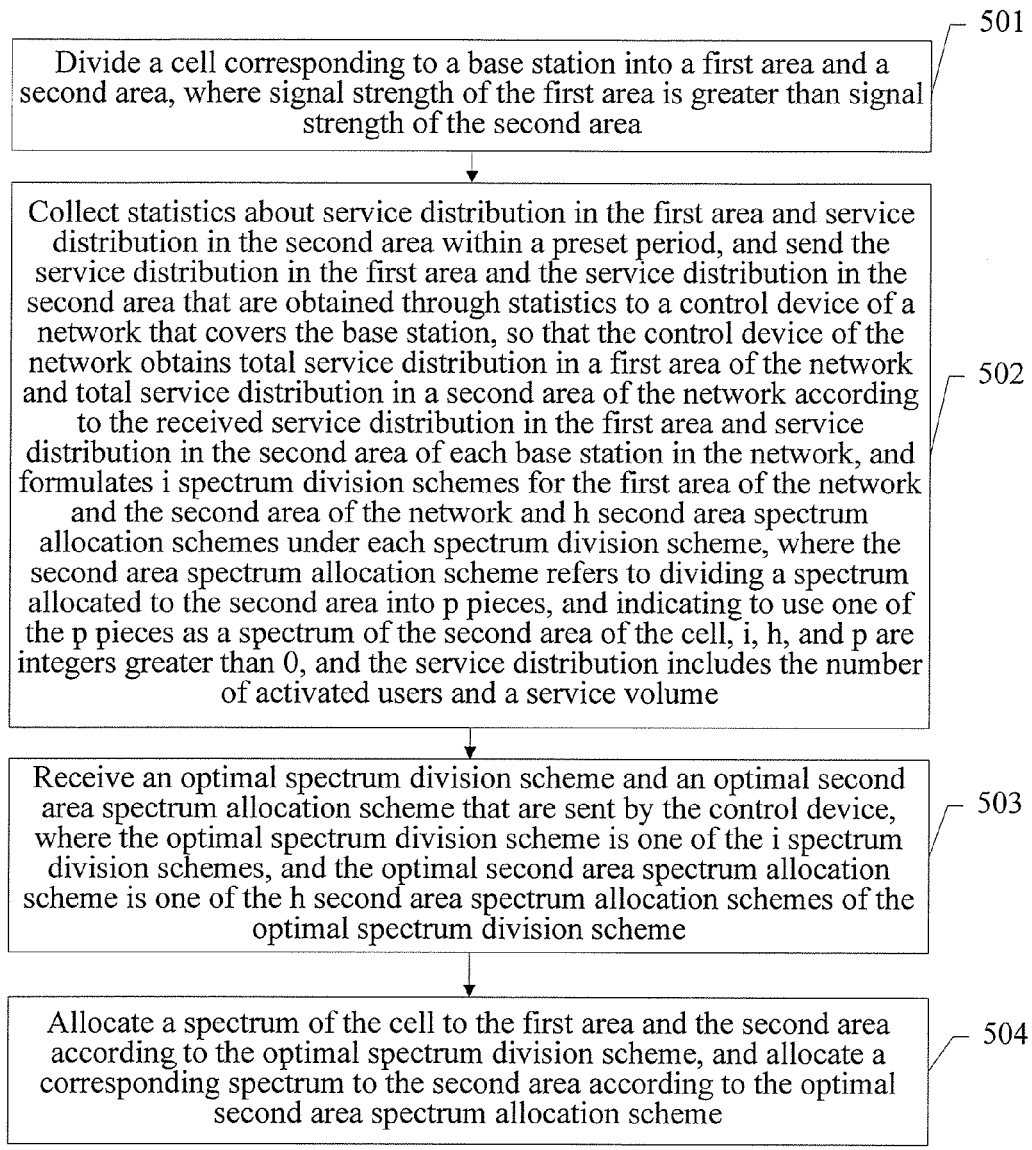
FIG. 5 is a schematic flow chart of another spectrum division method provided by an embodiment of the present invention.

FIG. 5 is a schematic flow chart of another spectrum division method provided by an embodiment of the present invention. As shown in FIG. 5, the method includes the following steps:

501: Divide a cell corresponding to a base station into a first area and a second area, where signal strength of the first area is greater than signal strength of the second area.

As an optional implementation manner, the dividing a cell corresponding to a base station into a first area and a second area may specifically be classifying an area in which signal receiving strength of a user is greater than or equal to a specific threshold as a first area, and classifying a remaining area as a second area.

Optionally, a cell may also be divided into several pixels; and a pixel in which signal receiving strength of a user is greater than or equal to a specific threshold is classified as a first area, and a pixel in which signal receiving strength of a user is smaller than the specific threshold is classified as a second area.

Optionally, the division may specifically be performed through the following formula:

$$CC_i = \{p \in C_i : P_{p,i} \geq \text{CELL\_CENTER\_THRESHILD} \times \max_{j \neq i}(P_{p,j})\}$$

where $C_i$ is a cell i under the base station, $CC_i$ is a first area of the cell i, p is a pixel pi of the cell i, CELL_CENTER_THRESHILD is a preset constant, $P_{p,i}$ and $P_{p,j}$ are strength of signals received by the pixel pi from the cell i and a cell j respectively, and the cell j is a neighboring cell of the cell i.

502: Collect statistics about service distribution in the first area and service distribution in the second area within a preset period, and send the service distribution in the first area and the service distribution in the second area that are obtained through statistics to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme, where the second area spectrum allocation scheme refers to dividing a spectrum allocated to the second area into p pieces, and indicating to use one of the p pieces as a spectrum of the second area of the cell, i, h, and p are integers greater than 0, and the service distribution includes the number of activated users and a service volume.

Optionally, after dividing the cell corresponding to the base station into the first area and the second area, service distribution in the first area and the second area may be obtained through statistics. It may specifically be that RSRP information sent by a user is received; in this way, service distribution at each pixel may be obtained through statistics, and it may be determined, according to a preset specific threshold (for example: CELL_CENTER_THRESHILD), whether each pixel in the preset period belongs to the first area or the second area. Therefore, the service distribution in the first area and the second area within the preset period may be obtained through statistics, that is, the number of activated users and the service volume in the first area and the second area are obtained through statistics; at the same time, a QCI sent by the user may also be received, and a service type requested by the user may be learned according to the QCI. In this way, the base station may obtain, through statistics, service distribution of each service type existing in the first area and the second area. For example, it is stipulated in an LTE network standard that services with QCIs being 1-4 are GBR services, and other services are NON-GBR services.

Optionally, after receiving service distribution of first areas and service distribution of second areas in the preset period sent by all base stations covered by the pre-specified network, the control device may formulate, according to obtained total service distribution in the first area of the network and total service distribution in the second area of the network, i spectrum division schemes for the first area of the network and the second area of the network and h second area spectrum allocation schemes under each spectrum division scheme, where the second area spectrum allocation scheme refers to dividing a spectrum allocated to the second area into p pieces and selecting one of the p pieces for the second area of the cell where each base station is located. An optimal spectrum division scheme and an optimal second area spectrum allocation scheme of the optimal spectrum division scheme are selected; and the optimal spectrum division scheme and the optimal second area spectrum allocation scheme are sent to the base station.

503: Receive the optimal spectrum division scheme and the optimal second area spectrum allocation scheme that are sent by the control device, where the optimal spectrum division scheme is one of the i spectrum division schemes, and the optimal second area spectrum allocation scheme is one of the h second area spectrum allocation schemes of the optimal spectrum division scheme.

504: Allocate a spectrum of the cell to the first area and the second area according to the optimal spectrum division scheme, and allocate a corresponding spectrum to the second area according to the optimal second area spectrum allocation scheme.

As an optional implementation manner, after receiving the service distribution of the first areas and the service distribution of the second areas in the preset period sent by all base stations covered by the pre-specified network, the control device may calculate a ratio between the obtained total service distribution in the first area of the network and total service distribution in the second area of the network, and use a multiple of the ratio as a spectrum division scheme for the first area of the network and the second area of the network, where a value of the multiple is a value in a set N, and values in the set N include i positive real numbers. Then, the optimal spectrum division scheme received in step 503 specifically is a multiple of the ratio between the total service distribution in the first area of the network and the total service distribution in the second area of the network received by the control device, where a value of the multiple is a value in a set N, and values in the set N include i positive real numbers.

Optionally, the optimal spectrum division scheme and the optimal second area spectrum allocation scheme that are received in 503 may specifically be a second area spectrum allocation scheme corresponding to a minimum joint KPI of the network and a spectrum division scheme corresponding to the second area spectrum allocation scheme with the minimum joint KPI of the network that are formulated by the control device.

As an optional implementation manner, step 502 may specifically include:

collecting statistics about service distribution of GBR services in the first area and service distribution of GBR services in the second area within the preset period, and sending the service distribution of guarantee bit rate GBR services in the first area and service distribution of GBR services in the second area that are obtained through statistics to the control device.

In this implementation manner, the optimal spectrum division scheme received in step 503 may specifically include:

a multiple of the ratio between the total service distribution of GBR services in the first area of the network and the total service distribution of GBR services in the second area of the network of all base stations covered by the pre-specified network obtained by the control device, where a value of the multiple is a value in a set N, and values in the set N include i positive real numbers.

As an optional implementation manner, this embodiment may specifically be applied to a base station, and the control device may specifically be a device in an EMS or an NMS.

Optionally, the base station may specifically perform information transmission with the control device through an internal interface or a standard northbound interface of the control device.

In the foregoing technical solution, a cell corresponding to a base station is divided into a first area and a second area; statistics about service distribution in the first area and service distribution in the second area within a preset period is collected, and the service distribution in the first area and the service distribution in the second area that are obtained through statistics are sent to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme; an optimal spectrum division scheme and an optimal second area spectrum allocation scheme that are sent by the control device are received, a spectrum of the cell is allocated to the first area and the second area according to the optimal spectrum division scheme, and a corresponding spectrum is allocated to the second area according to the optimal second area spectrum allocation scheme. In this way, spectrum division may change when service distribution changes, and is more suitable for a dynamic service, thereby improving a utilization rate of a spectrum resource.

Figure 6:
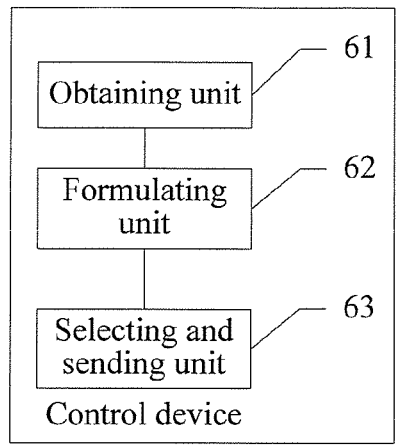
FIG. 6 is a schematic structural diagram of a control device provided by an embodiment of the present invention.

FIG. 6 is a schematic structural diagram of a control device provided by an embodiment of the present invention. As shown in FIG. 6, the control device includes an obtaining unit 61, a formulating unit 62, and a selecting and sending unit 63.

The obtaining unit 61 is configured to obtain service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station.

As a reliable implementation manner, before the obtaining unit 61 obtains service distribution in a first area and service distribution in a second area of each base station among all base stations covered by a pre-specified network within a preset period, all the base stations covered by the pre-specified network may divide cells corresponding to the base stations under the base stations into first areas and second areas. It may specifically be that an area in which signal receiving strength of a user is greater than or equal to a specific threshold is classified as a first area, and a remaining area is classified as a second area.

Optionally, after dividing the cell corresponding to the base station into the first area and the second area, the base station may obtain, through statistics, the service distribution in the first area and the second area. It may specifically be that RSRP information sent by a user is received; in this way, service distribution at each pixel may be obtained through statistics, and it may be determined, according to a preset specific threshold (for example: CELL_CENTER_THRESHILD), whether each pixel in the preset period belongs to the first area or the second area. Therefore, the service distribution in the first area and the second area within the preset period may be obtained through statistics, that is, the number of activated users and the service volume in the first area and the second area are obtained through statistics; at the same time, a QCI sent by the user may also be received, and a service type requested by the user may be learned according to the QCI. In this way, the base station may obtain, through statistics, service distribution of each service type existing in the first area and the second area. For example, it is stipulated in an LTE network standard that services with QCIs being 1-4 are GBR services, and other services are NON-GBR services.

Optionally, after obtaining, through statistics, the service distribution in the first area and the second area, the base station may send the service distribution obtained through statistics to a control device. In this way, the obtaining unit 61 may obtain the service distribution in the first area and the service distribution in the second area of each base station among all the base stations covered by the pre-specified network within the preset period.

The formulating unit 62 is configured to formulate, according to the obtained total service distribution in the first area of the network and total service distribution in the second area of the network, i spectrum division schemes for the first area of the network and the second area of the network and h second area spectrum allocation schemes corresponding to each spectrum division scheme, where the second area spectrum allocation scheme refers to dividing a spectrum allocated to the second area of the network into p pieces, and selecting one of the p pieces for a second area of the cell where each base station is located, and i, h, and p are integers greater than 0.

Optionally, the spectrum division scheme formulated by the formulating unit 62 specifically is a multiple of a ratio between the obtained total service distribution in the first area of the network and total service distribution in the second area of the network, where a value of the multiple is a value in a set N, and values in the set N include i positive real numbers, so as to find a suitable spectrum division scheme conveniently. For example, five spectrum division schemes may be obtained if N is set to five different values.

The selecting and sending unit 63 is configured to select an optimal spectrum division scheme and an optimal second area spectrum allocation scheme under the optimal spectrum division scheme, and send the optimal spectrum division scheme and the optimal second area spectrum allocation scheme to the base station, so that the base station allocates a spectrum of the cell to the first area and second area of the cell according to the optimal spectrum division scheme and the optimal second area spectrum allocation scheme, where the optimal spectrum division scheme is one of the i spectrum division schemes, and the optimal second area spectrum allocation scheme is one of the h second area spectrum allocation schemes of the optimal spectrum division scheme.

As an optional implementation manner, the obtaining unit 61 may specifically be further configured to obtain service distribution of guarantee bit rate GBR services in the first area and service distribution of GBR services in the second area of each base station among all the base stations covered by the pre-specified network within the preset period.

In this implementation manner, the formulating unit 62 formulates i spectrum division schemes for the first area of the network and the second area of the network according to the total service distribution in the first area of the network and the total service distribution in the second area of the network that are obtained by the obtaining unit. The formulated spectrum division scheme may specifically be a multiple of a ratio between the total service distribution of GBR services in the first area of the network and the total service distribution of GBR services in the second area of the network that are obtained by the obtaining unit 61, where a value of the multiple is a value in a set N, and values in the set N include i positive real numbers. In this way, i spectrum division schemes for the first area and the second area are obtained.

As an optional implementation manner, specifically, the control device may be a device in an EMS or an NMS.

Optionally, the base station may perform information transmission with the control device through an internal interface or a standard northbound interface of the control device.

In the foregoing technical solution, the obtaining unit obtains service distribution in a first area and service distribution in a second area of each base station among all base stations covered by a pre-specified network within a preset period; the formulating unit formulates i spectrum division schemes for a first area of the network and a second area of the network and h second area spectrum allocation schemes under each spectrum division scheme according to the obtained total service distribution in the first area of the network and total service distribution in the second area of the network; the selecting and sending unit selects an optimal spectrum division scheme and an optimal second area spectrum allocation scheme of the optimal spectrum division scheme, and sends the optimal spectrum division scheme and the optimal second area spectrum allocation scheme to the base station, so that the base station allocates a spectrum of a first area and a second area of the cell according to the optimal spectrum division scheme and the optimal second area spectrum allocation scheme. In this way, spectrum division may change when service distribution changes, and is more suitable for a dynamic service, thereby improving a utilization rate of a spectrum resource.

Figure 7:
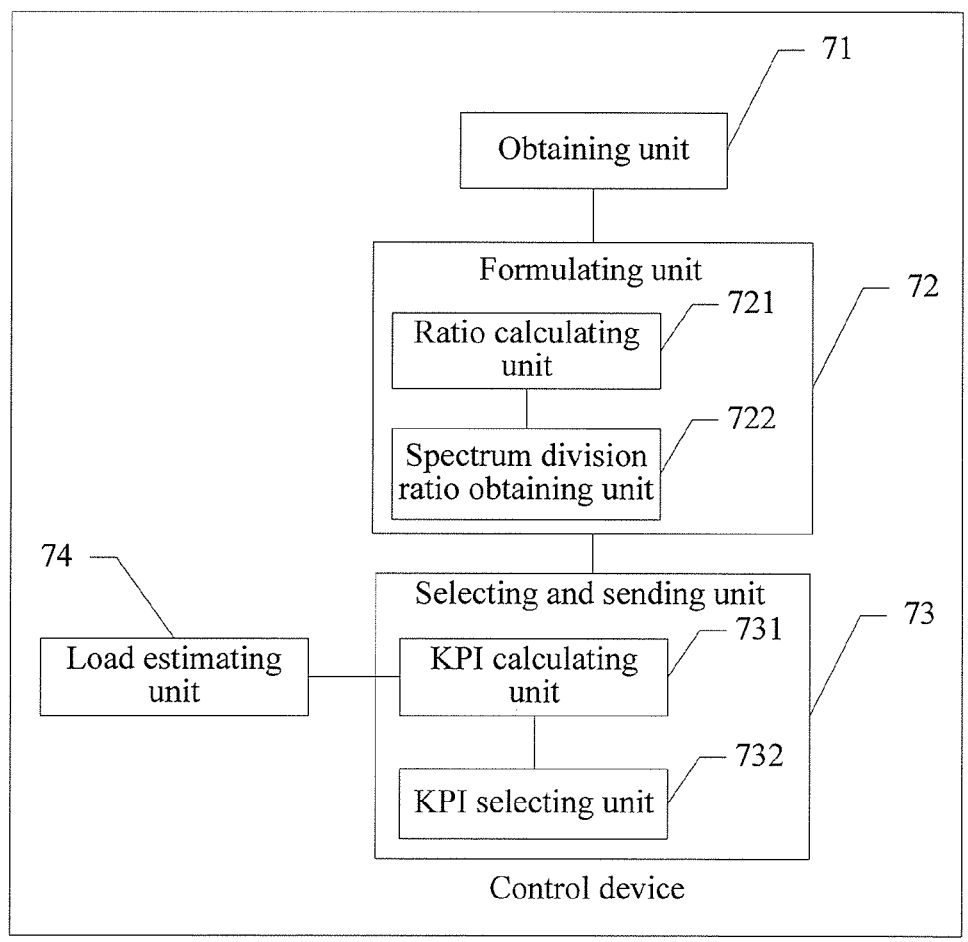
FIG. 7 is a schematic structural diagram of another control device provided by an embodiment of the present invention.

FIG. 7 is a schematic structural diagram of another control device provided by an embodiment of the present invention. As shown in FIG. 7, the control device includes: an obtaining unit 71, a formulating unit 72, and a selecting and sending unit 73, where the formulating unit 72 includes a ratio calculating unit 721 and a spectrum division scheme obtaining unit 722, and the selecting and sending unit 73 includes a KPI calculating unit 731 and a KPI selecting unit 732.

The obtaining unit 71 is configured to obtain service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station.

The ratio calculating unit 721 is configured to calculate a ratio between the obtained total service distribution in the first area of the network and total service distribution in the second area of the network.

The spectrum division scheme obtaining unit 722 is configured to use a multiple of the ratio as a spectrum division scheme for the first area of the network and the second area of the network, and formulate h second area spectrum allocation schemes under each spectrum division scheme, where a value of the multiple is a value in a set N, values in the set N include i positive real numbers, the second area spectrum allocation scheme refers to dividing a spectrum allocated to the second area into p pieces, and selecting one of the p pieces for a second area of the cell where each base station is located, and i, h, and p are integers greater than 0.

The KPI calculating unit 731 is configured to calculate a joint KPI which is of the network and corresponds to each second area spectrum allocation scheme.

The KPI selecting unit 732 is configured to select a second area spectrum allocation scheme corresponding to a minimum joint KPI of the network and a spectrum division scheme corresponding to the second area spectrum allocation scheme with the minimum joint KPI of the network, use the selected spectrum division scheme as an optimal spectrum division scheme, and use the selected second area spectrum allocation scheme as an optimal second area spectrum allocation scheme of the optimal spectrum division scheme.

As an optional implementation manner, the joint KPI of the network calculated by the KPI calculating unit 731 may specifically include: a CDBR of GBR services and a THP of Non-GBR services of the network.

In this implementation manner, the KPI calculating unit 731 may specifically be further configured to calculate a CDBR which is of GBR services of the network and corresponds to each second area spectrum allocation scheme and a THP which is of Non-GBR services of the network and corresponds to each second area spectrum allocation scheme, and calculate a joint KPI which is of the network and corresponds to each second area spectrum allocation scheme through the following formula:

$$FF(b, \eta) = \left(CDBR + \lambda * \left(1 - \frac{THP}{AMBR}\right)\right)$$

where $FF(b,\eta)$ is the joint KPI of the network, AMBR is an aggregate maximum bit rate of Non-GBR services, and $\lambda$ satisfies that $0 < \lambda \leq 1$.

Optionally, the KPI calculating unit 731 may specifically be further configured to calculate the CDBR which is of GBR services of the network and corresponds to each second area spectrum allocation scheme through the following formula:

$$CDBR(\bar{\rho}, MC) = \frac{\sum_{SC_i \in SC} \max(MC_i \cdot (1 - 1/\hat{\rho}_i), 0)}{\sum_{SC_i \in SC} MC_i}$$

where $SC_i$ is the first area or the second area, SC is a set of all $SC_i$ in the network, $MC_i$ and $\hat{\rho}_i$ are the number of activated users and an estimated load of GBR services in $SC_i$ respectively.

The KPI calculating unit 731 may specifically be further configured to calculate the THP which is of Non-GBR services of the network and corresponds to each second area spectrum allocation scheme through the following formulas:

$$THP(\bar{\rho}, T, b) = \sum_{SC_i \in SC} THP_i = \sum_{SC_i \in SC} k_i^{sch} \eta^{BW} (1 - \rho_i) W_i f\left(\left(Q_i + \sum_{\tau \in I_i} \rho_\tau R_{i,\tau}\right) / N_i\right)$$

where $k_i^{sch}$ and $\eta^{BW}$ are coefficients corresponding to a scheduler, $\rho_i$ is a real load of GBR services in $SC_i$, and $\rho_i = \min(1, \hat{\rho}_i)$, $W_i$ is a bandwidth which is of an allocated spectrum of $SC_i$ and corresponds to the second area spectrum allocation scheme, $I_i$ is a set of areas that interfere with $SC_i$, $\rho_\tau$ is an estimated load of GBR services and Non-GBR services in an area $\tau$, $R_{i,\tau}$ is a spectrum utilization rate, and $N_i$ is the number of activated users of Non-GBR services in $SC_i$; and $$f(x) = \frac{\log(2)}{\ln(1 + 1/x)}, \quad Q_i = \frac{P^{noise}}{\eta^{SINR}} \sum_{p \in SC_i} \frac{T(p)}{P_{p,i}};$$

where $P_{noise}$ is a noise volume, $\eta_{SINR}$ is a coefficient corresponding to a scheduler, $T(p)$ is the number of activated users of Non-GBR services at a pixel pi in $SC_i$, $P_{p,i}$ is receiving power at the pixel pi, the first area includes several pixels, the second area includes several pixels, and the pixel pi is a pixel in the first area or the second area.

Optionally, the control device may further include:

a load estimating unit 74, configured to calculate an estimated load which is of GBR services in the first area and corresponds to each second area spectrum allocation scheme and an estimated load which is of GBR services in the second area and corresponds to each second area spectrum allocation scheme through the following formulas respectively:

$$\hat{\rho}_i \leq \frac{G_i}{W_i} f\left(\frac{N_i}{G_i} + \sum_{i' \in I_i} \frac{H_{i,i'} \min(\hat{\rho}_{i'}, 1)}{G_i}\right)$$

where $\hat{\rho}_i$ is an estimated load of GBR services in a subarea i, the subarea is the first area or the second area, and $I_i$ is a set of subareas that interfere with the subarea i; and $$f(x) = \frac{\log(2)}{\ln(1 + 1/x)}$$

$$G_i = \sum_{s \in S} \sum_{p \in SC_i} \frac{T_{s,p} D_s}{k_i^{sch} \eta^{BW}}$$

$$N_i = \sum_{s \in S} \sum_{p \in SC_i} \frac{T_{s,p} D_s \eta^{SINR} P^n}{k_i^{sch} \eta^{BW} P_i g_{i,p}}$$

$$H_{i,i'} = \sum_{s \in S} \sum_{p \in SC_i} \frac{T_{s,p} D_s \eta^{SINR} P_{i'} g_{i',p}}{k_i^{sch} \eta^{BW} P_i g_{i,p}}$$

where $P_i$ and $P_{i'}$ are transmit power of the subarea i and a subarea i' respectively, $g_{i,p}$ and $g_{i',p}$ are a channel gain from a base station to which the subarea i belongs to the pixel pi and a channel gain from a base station to which a neighboring subarea of the subarea i' belongs to the pixel pi respectively, the subarea i' is a neighboring subarea of the subarea i, $D_s$ is a data rate required by a service s among GBR services, $T_{s,p}$ is the number of activated users at the pixel pi in the subarea i, $T_{s,p} D_s$ represents service distribution of the service s at the pixel pi, and S represents a set of all services of GBR services.

$W_i$, namely, a spectrum of the subarea, exists in the foregoing formula; therefore, an estimated load of GBR services in the subarea calculated based on a different $W_i$ varies. $W_i$ is decided by the spectrum division scheme, that is, a different $W_i$ is obtained in a different spectrum division scheme, thereby obtaining estimated loads which are of GBR services in different subareas and correspond to different spectrum division schemes. The CDBR of GBR services and the THP of Non-GBR services in the subarea are calculated based on the estimated load of GBR services in the subarea, and the joint KPI of the network is calculated based on CDBRs of GBR services and THPs of Non-GBR services in all subareas; in this way, different joint KPIs which are of the network and correspond to different spectrum division schemes may be obtained.

As an optional implementation manner, the selecting and sending unit 73 may be further configured to obtain, by performing a genetic algorithm, a joint network performance indicator KPI corresponding to the second area spectrum allocation scheme, select a second area spectrum allocation scheme corresponding to a minimum joint KPI of the network and a spectrum division scheme corresponding to the second area spectrum allocation scheme with the minimum joint KPI of the network, use the selected spectrum division scheme as an optimal spectrum division scheme, and use the selected second area spectrum allocation scheme as an optimal second area spectrum allocation scheme of the optimal spectrum division scheme.

Optionally, the genetic algorithm provided in the foregoing embodiment may specifically be adopted as the foregoing genetic algorithm.

Figure 8:
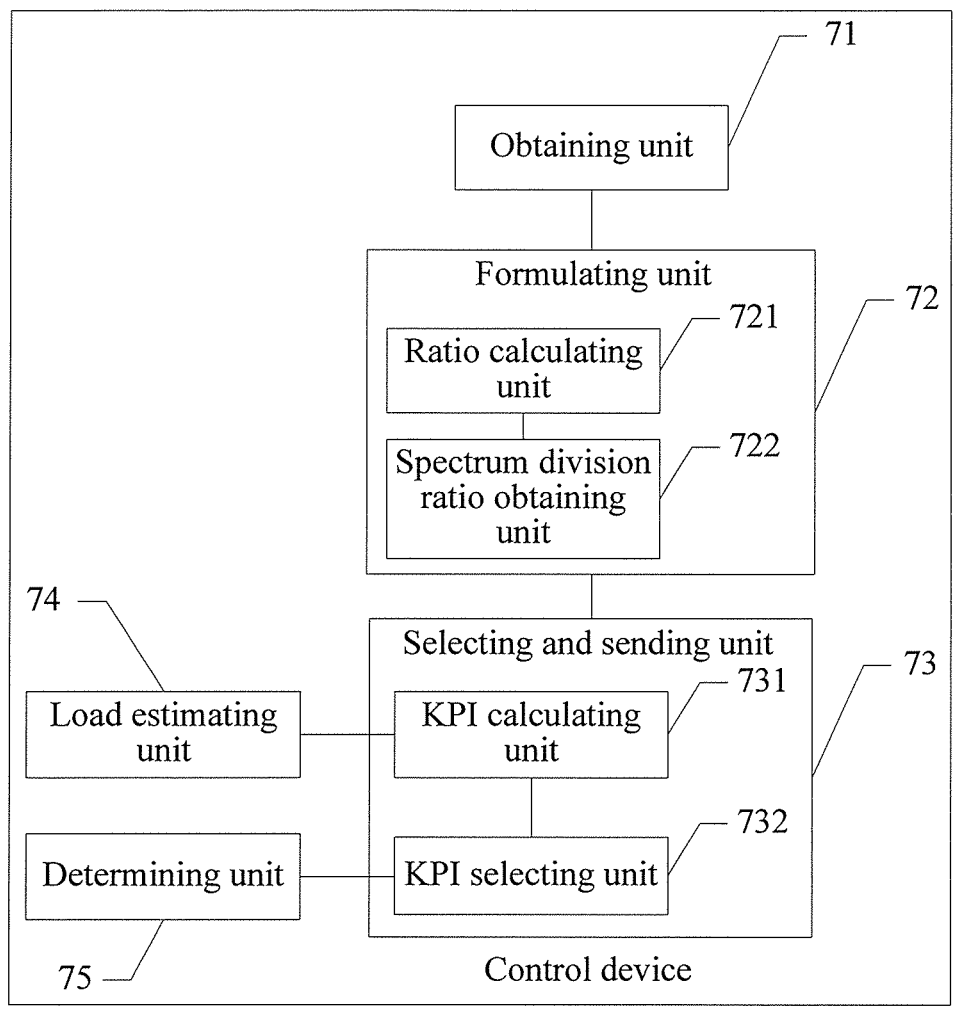
FIG. 8 is a schematic structural diagram of another control device provided by an embodiment of the present invention.

As an optional implementation manner, as shown in FIG. 8, the control device may further include:

a determining unit 75, configured to determine whether the joint KPI which is of the network and corresponds to the optimal second area spectrum allocation scheme is greater than a current joint KPI of the network, and if yes, send the optimal spectrum division scheme and the optimal second area spectrum allocation scheme to the base station.

In this way, it can be ensured that the joint KPI which is of the network and corresponds to the optimal spectrum division scheme and the optimal second area spectrum allocation scheme which are sent by the selecting and sending unit 73 to the base station is greater than the current joint KPI of the network, thereby providing a utilization rate of a spectrum resource.

In the foregoing technical solution, the selecting and sending unit may select an optimal second area spectrum allocation scheme with a minimum joint KPI of a network and an optimal spectrum division scheme corresponding to the optimal second area spectrum allocation scheme, and then send the selected optimal second area spectrum allocation scheme and optimal spectrum division scheme to the base station. In this way, the base station allocates a spectrum of a cell to a first area of the base station and a second area of the base station according to the optimal spectrum division scheme, and then selects, according to the optimal second area spectrum allocation scheme, one piece of the spectrum allocated to the second area; a network KPI corresponding to the optimal second area spectrum allocation scheme of the optimal spectrum division scheme is minimum, and therefore, a utilization rate of a spectrum resource may be improved.

Figure 9:
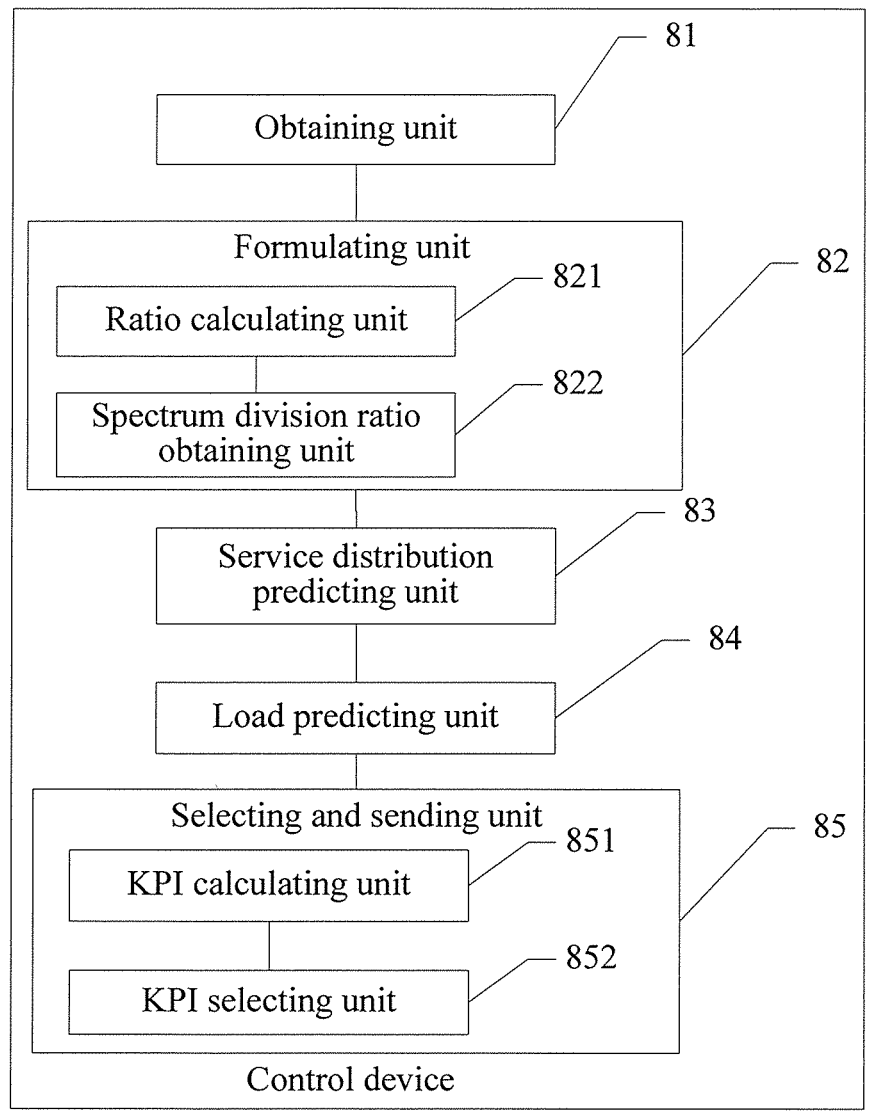
FIG. 9 is a schematic structural diagram of another control device provided by an embodiment of the present invention.

FIG. 9 is a schematic structural diagram of another control device provided by an embodiment of the present invention. As shown in FIG. 9, the control device includes: an obtaining unit 81, a formulating unit 82, a service distribution predicting unit 83, a load predicting unit 84, and a selecting and sending unit 85, where the formulating unit 82 includes a ratio calculating unit 821 and a spectrum division scheme obtaining unit 822, and the selecting and sending unit 85 includes a KPI calculating unit 851 and a KPI selecting unit 852.

The obtaining unit 81 is configured to obtain service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station.

The ratio calculating unit 821 is configured to calculate a ratio between the obtained total service distribution in the first area of the network and total service distribution in the second area of the network.

The spectrum division scheme obtaining unit 822 is configured to use a multiple of the ratio as a spectrum division scheme for the first area of the network and the second area of the network, and formulate h second area spectrum allocation schemes under each spectrum division scheme, where a value of the multiple is a value in a set N, values in the set N include i positive real numbers, the second area spectrum allocation scheme refers to dividing a spectrum allocated to the second area into p pieces, and selecting one of the p pieces for a second area of the cell where each base station is located, and i, h, and p are integers greater than 0.

The service distribution predicting unit 83 is configured to predict service distribution in the first area and the second area within a next preset period of a current preset period, where the current preset period is the preset period within which the obtaining unit 81 obtains service distribution of guarantee bit rate GBR services in the first area and service distribution of GBR services in the second area of each base station among all the base stations covered by the pre-specified network.

As an optional implementation manner, the service distribution predicting unit 83 may predict the service distribution in the first area and the second area in the next preset period through the following formula:

$$L_t = \zeta \cdot (x_t - I_{t-d}) + (1-\zeta) \cdot L_{t-1}$$

$$I_t = \delta \cdot (x_t - L_t) + (1-\delta) \cdot I_{t-d}$$

$$\hat{x}_{t+h} = L_t + I_{t-d+h \bmod d}$$

where t is the current preset period; $L_t$ is a mean value part which is of the number of activated users of GBR services at a pixel pi and is calculated according to the number of activated users of GBR services at the pixel pi within t and a preset period before t; $I_t$ is a period part which is of the number of activated users of GBR services at the pixel pi and is calculated according to the number of activated users of GBR services at the pixel pi within t and a preset period before t; d is a period of time series of the number of activated users of the GBR services; is the number of activated users of GBR services at the pixel pi within t; $0 \leq \zeta \leq 1$ and $0 \leq \delta \leq 1$ are parameters for controlling smoothness; $\hat{x}_{t+h}$ is the number of activated users of GBR services at the pixel within the next preset period, and a value of h is 1.

The load predicting unit 84 is configured to calculate, according to the predicted service distribution, an estimated load which is of GBR services in the first area and corresponds to each second area spectrum allocation scheme and an estimated load which is of GBR services in the second area and corresponds to each second area spectrum allocation scheme.

Optionally, the load predicting unit 84 may calculate an estimated load of GBR services in the first area and an estimated load of GBR services in the second area with reference to the calculation manner provided in the foregoing embodiment.

The KPI calculating unit 851 is configured to calculate a CDBR which is of GBR services of the network and corresponds to each second area spectrum allocation scheme and a THP which is of Non-GBR services of the network and corresponds to each second area spectrum allocation scheme, and calculate a joint KPI which is of the network and corresponds to each second area spectrum allocation scheme through the following formula:

$$FF(b, \eta) = \left(CDBR + \lambda * \left(1 - \frac{THP}{AMBR}\right)\right)$$

where FF(b,η) is the joint KPI of the network, AMBR is a constant of an aggregate maximum bit rate of Non-GBR services, and λ satisfies that $0 < \lambda \leq 1$.

Optionally, the KPI calculating unit 851 may specifically calculate, according to the estimated load which is of GBR services in the first area and corresponds to each second area spectrum allocation scheme and the estimated load which is of GBR services in the second area and corresponds to each second area spectrum allocation scheme which are calculated by the load predicting unit 84, the CDBR which is of GBR services of the network and corresponds to each second area spectrum allocation scheme and the THP which is of Non-GBR services of the network and corresponds to each second area spectrum allocation scheme.

For a specific calculation process, reference may be made to the calculation manner provided in the foregoing embodiment.

The KPI selecting unit 852 is configured to select a second area spectrum allocation scheme corresponding to a minimum joint KPI of the network and a spectrum division scheme corresponding to the second area spectrum allocation scheme with the minimum joint KPI of the network, use the selected spectrum division scheme as an optimal spectrum division scheme, and use the selected second area spectrum allocation scheme as an optimal second area spectrum allocation scheme of the optimal spectrum division scheme.

In the foregoing technical solution, it may be implemented that the service distribution predicting unit predicts service distribution in a first area and a second area within a next preset period of a current preset period, the load predicting unit calculates, according to the predicted service distribution, an estimated load which is of GBR services in the first area and corresponds to each second area spectrum allocation scheme and an estimated load which is of GBR services in the second area and corresponds to each second area spectrum allocation scheme, and then the selecting and sending unit calculates a joint KPI which is of a network and corresponds to each second area spectrum allocation scheme, so as to select a second area spectrum allocation scheme corresponding to a minimum joint KPI of the network and a spectrum division scheme corresponding to the second area spectrum allocation scheme with the minimum joint KPI of the network, and use the selected spectrum division scheme as an optimal spectrum division scheme. In this way, a utilization rate of a spectrum resource may be improved.

Figure 10:
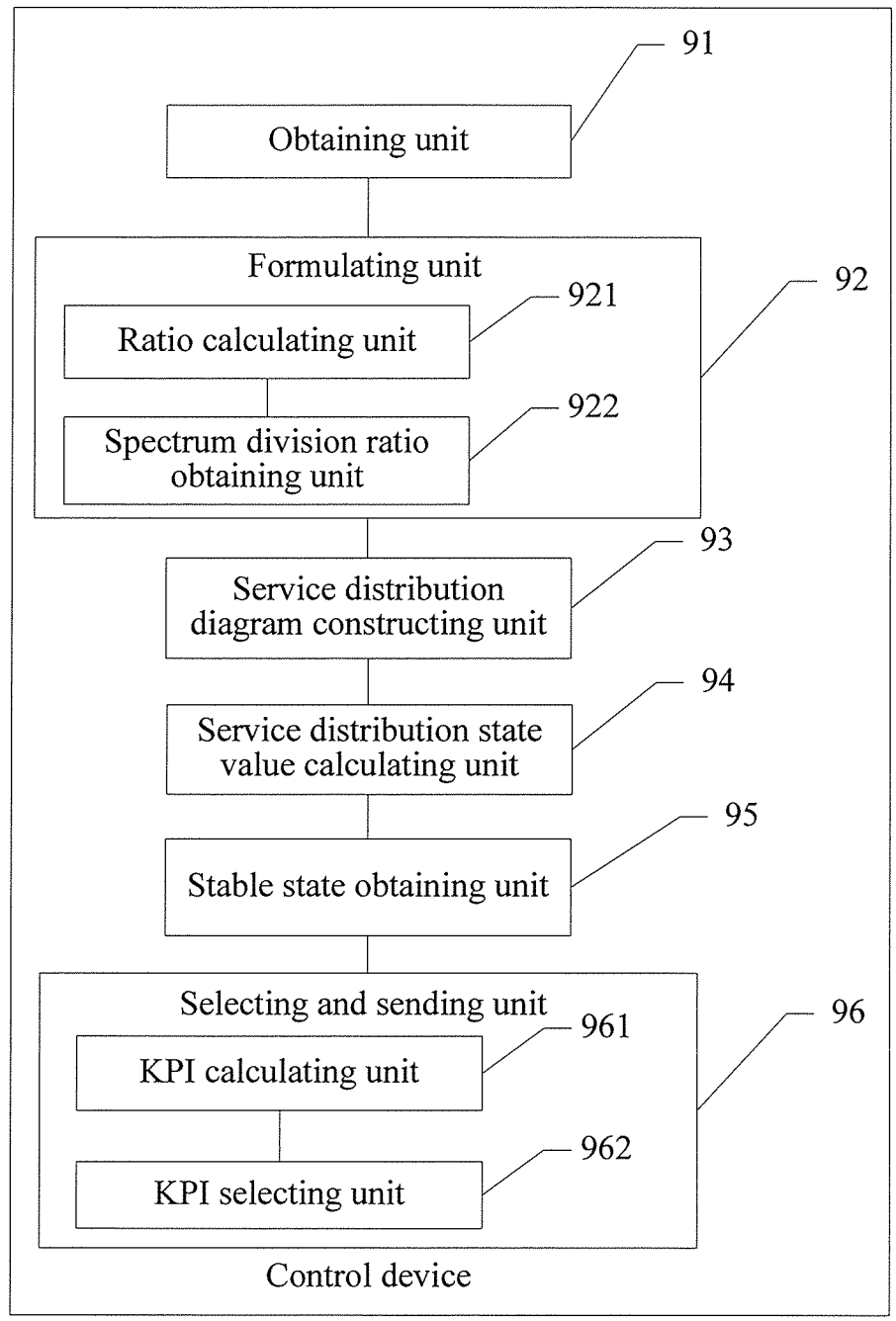
FIG. 10 is a schematic structural diagram of another control device provided by an embodiment of the present invention.

FIG. 10 is a schematic structural diagram of another control device provided by an embodiment of the present invention. As shown in FIG. 10, the control device includes: an obtaining unit 91, a formulating unit 92, a service distribution diagram constructing unit 93, a service distribution state calculating unit 94, a stable state obtaining unit 95, and a selecting and sending unit 96, where the formulating unit 82 includes a ratio calculating unit 921 and a spectrum division scheme obtaining unit 922, and the selecting and sending unit 96 includes a KPI calculating unit 961 and a KPI selecting unit 962.

The obtaining unit 91 is configured to obtain service distribution in a first area and service distribution in a second area of each base station among all base stations covered by a pre-specified network within at least one preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station.

The ratio calculating unit 921 is configured to calculate a ratio between the obtained total service distribution in the first area of the network and total service distribution in the second area of the network.

The spectrum division scheme obtaining unit 922 is configured to use a multiple of the ratio as a spectrum division scheme for the first area of the network and the second area of the network, and formulate h second area spectrum allocation schemes under each spectrum division scheme, where a value of the multiple is a value in a set N, values in the set N include i positive real numbers, the second area spectrum allocation scheme refers to dividing a spectrum allocated to the second area into p pieces, and selecting one of the p pieces for a second area of the cell where each base station is located, and i, h, and p are integers greater than 0.

The service distribution diagram constructing unit 93 is configured to construct a service distribution diagram of the network within the at least one preset period.

The service distribution state calculating unit 94 is configured to calculate a service distribution state of the network within each preset period.

The stable state obtaining unit 95 is configured to group similar service distribution states among service distribution states within the at least one preset period into one cluster, group temporally continuous preset periods in a same cluster into a time interval, obtain, through statistics, a stable-state time interval in the time interval, and obtain a stable state of the stable-state time interval.

The stable state is a mean value of all service distribution states within the stable-state time interval, and the stable-state time interval refers to a sub-time interval [a',b'] satisfying the following conditions:

$$a'=\min\{t\in[a,b]:\rho(v_t,E_{[a,b]}) > SST \times \rho(v_t,E_{[c,a-1]})\}$$

$$b'=\min\{t\in[a,b]:\rho(v_t,E_{[a,b]}) > SST \times \rho(v_t,E_{[b+1,d]})\}$$

$$a'<b';$$

where SST is a preset constant, [a',b'] is a sub-time interval, [a,b] is a time interval where [a',b'] is located, [c,a−1] and [b+1,d] are adjacent time intervals before and after [a,b] respectively, $\rho(f)$ is a difference value between a service distribution state within a time interval and a mean value of all service distribution states within the time interval, $v_t$ is a service distribution state within [a,b], and $E_{[a,b]}$ is a mean value of all service distribution states within [a,b].

The KPI calculating unit 961 is configured to calculate a joint KPI which is of the network at the stable state and corresponds to each second area spectrum allocation scheme.

Optionally, the KPI calculating unit 961 may calculate the joint KPI which is of the network at the stable state and corresponds to each second area spectrum allocation scheme with reference to the calculation method provided in the foregoing embodiment.

The KPI selecting unit 962 is configured to select a second area spectrum allocation scheme corresponding to a minimum joint KPI of the network and a spectrum division scheme corresponding to the second area spectrum allocation scheme with the minimum joint KPI of the network, use the selected spectrum division scheme as an optimal spectrum division scheme, and use the selected second area spectrum allocation scheme as an optimal second area spectrum allocation scheme of the optimal spectrum division scheme.

As an optional implementation manner, the ratio calculating unit 921 may specifically calculate a ratio between the obtained total service distribution of GBR services in the first area at the stable state and total service distribution of GBR services in the second area at the stable state.

Optionally, the ratio between the obtained total service distribution of GBR services in the first area at the stable state and total service distribution of GBR services in the second area at the stable state may specifically be calculated through the following formula:

$$\Psi = \frac{\sum_{ss \in SS} \sum_{p \in SC_{inner}} T_{s,p} D_s}{\sum_{ss \in SS} \sum_{p \in SC_{outer}} T_{s,p} D_s}$$

where $\Psi$ is the ratio, ss is a stable state ss, SS is a set of stable states, $SC_{first}$ and $SC_{second}$ are a set of first areas and a set of second areas respectively, $SC_{first} \cap SC_{second} = SC$, SC is a set of the first areas and the second areas, $T_{s,p}$ is the number of activated users of GBR services at a pixel pi at the stable state ss, $D_s$ is a data rate required by GBR services, and $T_{s,p} D_s$ is a service volume of GBR services at the pixel pi at the stable state ss.

In the foregoing technical solution, it may be implemented that a joint network performance KPI which is at a stable state and corresponds to a second area spectrum allocation scheme is calculated; because a change of a service at the stable state is stable, an optimal spectrum division scheme and an optimal second area spectrum allocation scheme which are selected in this manner are more suitable for spectrum division of a cell, thereby improving a utilization rate of a spectrum of the cell, and at the same time, reducing a cost for spectrum adjustment.

Figure 11:
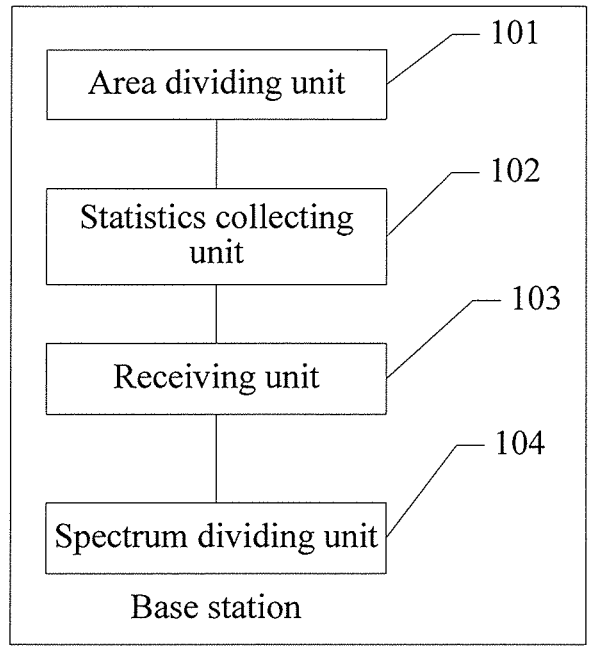
FIG. 11 is a schematic structural diagram of a base station provided by an embodiment of the present invention.

FIG. 11 is a schematic structural diagram of a base station provided by an embodiment of the present invention. As shown in FIG. 11, the base station includes: an area dividing unit 101, a statistics collecting unit 102, a receiving unit 103, and a spectrum dividing unit 104.

The area dividing unit 101 is configured to divide a cell corresponding to a base station into a first area and a second area, where signal strength of the first area is greater than signal strength of the second area.

As an optional implementation manner, the dividing, by the area dividing unit 101, a cell corresponding to a base station into a first area and a second area may specifically be classifying an area in which signal receiving strength of a user is greater than or equal to a specific threshold as a first area, and classifying a remaining area as a second area.

The statistics collecting unit 102 is configured to collect statistics about service distribution in the first area and service distribution in the second area within a preset period, and send the service distribution in the first area and the service distribution in the second area that are obtained through statistics to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme, where the second area spectrum allocation scheme refers to dividing a spectrum allocated to the second area into p pieces, and indicating to use one of the p pieces as a spectrum of a second area of the cell, i, h, and p are integers greater than 0, and the service distribution includes the number of activated users and a service volume.

Optionally, after receiving service distribution of first areas and service distribution of second areas in the preset period sent by all base stations covered by the pre-specified network, the control device may formulate, according to obtained total service distribution in the first area of the network and total service distribution in the second area of the network, i spectrum division schemes for the first area of the network and the second area of the network and h second area spectrum allocation schemes under each spectrum division scheme, where the second area spectrum allocation scheme refers to dividing a spectrum allocated to the second area into p pieces and selecting one of the p pieces for the second area of the cell where each base station is located. An optimal spectrum division scheme and an optimal second area spectrum allocation scheme of the optimal spectrum division scheme are selected; and the optimal spectrum division scheme and the optimal second area spectrum allocation scheme are sent to the base station.

The receiving unit 103 is configured to receive the optimal spectrum division scheme and the optimal second area spectrum allocation scheme that are sent by the control device, where the optimal spectrum division scheme is one of the i spectrum division schemes, and the optimal second area spectrum allocation scheme is one of the h second area spectrum allocation schemes of the optimal spectrum division scheme.

The spectrum dividing unit 104 is configured to allocate a spectrum of the cell to the first area and the second area according to the optimal spectrum division scheme received by the receiving unit 103, and allocate a corresponding spectrum to the second area according to the optimal second area spectrum allocation scheme.

As an optional implementation manner, after receiving the service distribution of the first areas and the service distribution of the second areas in the preset period sent by all base stations covered by the pre-specified network, the control device may calculate a ratio between the obtained total service distribution in the first area of the network and total service distribution in the second area of the network, and use a multiple of the ratio as a spectrum division scheme for the first area of the network and the second area of the network, where a value of the multiple is a value in a set N, and values in the set N include i positive real numbers. Then, the optimal spectrum division scheme received by the receiving unit 103 specifically is a multiple of the ratio between the total service distribution in the first area of the network and the total service distribution in the second area of the network received by the control device, where a value of the multiple is a value in a set N, and values in the set N include i positive real numbers.

As an optional implementation manner, the statistics collecting unit 102 may be further configured to collect statistics about service distribution of GBR services in the first area and service distribution of GBR services in the second area within the preset period, and send the service distribution of guarantee bit rate GBR services in the first area and service distribution of GBR services in the second area that are obtained through statistics to the control device.

In this implementation manner, the spectrum division scheme received by the receiving unit 103 may specifically include:

a multiple of the ratio between the total service distribution of GBR services in the first area of the network and the total service distribution of GBR services in the second area of the network of all base stations covered by the pre-specified network obtained by the control device, where a value of the multiple is a value in a set N, and values in the set N include i positive real numbers.

As an optional implementation manner, specifically, the control device may specifically be a device in an EMS or an NMS.

Optionally, the base station may specifically perform information transmission with the control device through an internal interface or a standard northbound interface of the control device.

In the foregoing technical solution, an area dividing unit divides a cell corresponding to a base station into a first area and a second area; a statistics collecting unit collects statistics about service distribution in the first area and service distribution in the second area within a preset period, and sends the service distribution in the first area and the service distribution in the second area that are obtained through statistics to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme; a receiving unit receives an optimal spectrum division scheme and an optimal second area spectrum allocation scheme that are sent by the control device; and a spectrum dividing unit allocates a spectrum of the cell to the first area and the second area according to the optimal spectrum division scheme, and allocates a corresponding spectrum to the second area according to the optimal second area spectrum allocation scheme. In this way, spectrum division may change when the service distribution changes, and is more suitable for a dynamic service, thereby improving a utilization rate of a spectrum resource.

Figure 12:
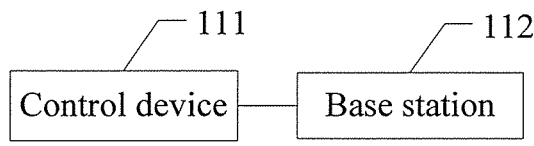
FIG. 12 is a schematic structural diagram of a spectrum division system provided by an embodiment of the present invention.

FIG. 12 is a schematic structural diagram of a spectrum division system provided by an embodiment of the present invention. As shown in FIG. 12, the system includes: a control device 111 and a base station 112.

The control device 111 may be a control device of any implementation manner provided by the foregoing embodiment.

For example, the control device 111 may include: an obtaining unit, a formulating unit, and a selecting and sending unit.

The obtaining unit is configured to obtain service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station.

The formulating unit is configured to formulate, according to the obtained total service distribution in the first area of the network and total service distribution in the second area of the network, i spectrum division schemes for the first area of the network and the second area of the network and h second area spectrum allocation schemes corresponding to each spectrum division scheme, where the second area spectrum allocation scheme refers to dividing a spectrum allocated to the second area of the network into p pieces, and selecting one of the p pieces for a second area of the cell where each base station is located, and i, h, and p are integers greater than 0.

The selecting and sending unit is configured to select an optimal spectrum division scheme and an optimal second area spectrum allocation scheme under the optimal spectrum division scheme, and send the optimal spectrum division scheme and the optimal second area spectrum allocation scheme to the base station, so that the base station allocates a spectrum of the cell to the first area and second area of the cell according to the optimal spectrum division scheme and the optimal second area spectrum allocation scheme, where the optimal spectrum division scheme is one of the i spectrum division schemes, and the optimal second area spectrum allocation scheme is one of the h second area spectrum allocation schemes of the optimal spectrum division scheme.

The base station 112 may be a base station of any implementation manner provided by the foregoing embodiment.

For example, the base station 112 may include: an area dividing unit, a statistics collecting unit, a receiving unit, and a spectrum dividing unit.

The area dividing unit is configured to divide a cell corresponding to a base station into a first area and a second area, where signal strength of the first area is greater than signal strength of the second area.

The statistics collecting unit is configured to collect statistics about service distribution in the first area and service distribution in the second area within a preset period, and send the service distribution in the first area and the service distribution in the second area that are obtained through statistics to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme, where the second area spectrum allocation scheme refers to dividing a spectrum allocated to the second area into p pieces, and indicating to use one of the p pieces as a spectrum of the second area of the cell, i, h, and p are integers greater than 0, and the service distribution includes the number of activated users and a service volume.

The receiving unit is configured to receive an optimal spectrum division scheme and an optimal second area spectrum allocation scheme that are sent by the control device, where the optimal spectrum division scheme is one of the i spectrum division schemes, and the optimal second area spectrum allocation scheme is one of the h second area spectrum allocation schemes under the optimal spectrum division scheme.

The spectrum dividing unit is configured to allocate a spectrum of the cell to the first area and the second area according to the optimal spectrum division scheme received by the receiving unit, and allocate a corresponding spectrum to the second area according to the optimal second area spectrum allocation scheme.

In the foregoing technical solution, the control device obtains service distribution in a first area and service distribution in a second area of each base station among all base stations covered by a pre-specified network within a preset period, formulates i spectrum division schemes for a first area of the network and a second area of the network and h second area spectrum allocation schemes under each spectrum division scheme according to the obtained total service distribution in the first area of the network and total service distribution in the second area of the network, selects an optimal spectrum division scheme and an optimal second area spectrum allocation scheme of the optimal spectrum division scheme, and sends the optimal spectrum division scheme and the optimal second area spectrum allocation scheme to the base station, so that the base station allocates a spectrum of a cell to a first area and a second area according to the optimal spectrum division scheme and the optimal second area spectrum allocation scheme, and allocates a corresponding spectrum to the second area according to the optimal second area spectrum allocation scheme. In this way, spectrum division may change when service distribution changes, and is more suitable for a dynamic service, thereby improving a utilization rate of a spectrum resource.

Figure 13:
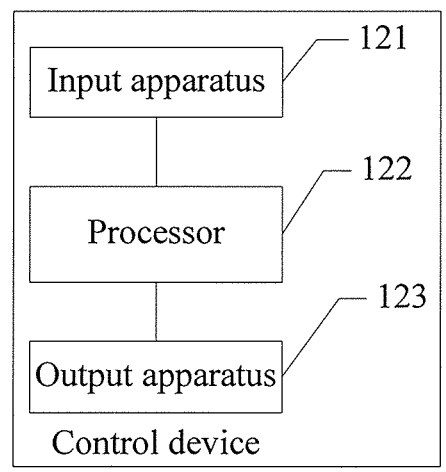
FIG. 13 is a schematic structural diagram of another control device provided by an embodiment of the present invention.

FIG. 13 is a schematic structural diagram of another control device provided by an embodiment of the present invention. As shown in FIG. 13, the control device includes: an input apparatus 121, a processor 122, and an output apparatus 123.

The processor 122 is configured to perform the following steps:

obtaining service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station;

formulating, according to the obtained total service distribution in the first area of the network and total service distribution in the second area of the network, i spectrum division schemes for the first area of the network and the second area of the network and h second area spectrum allocation schemes corresponding to each spectrum division scheme, where the second area spectrum allocation scheme refers to dividing a spectrum allocated to the second area of the network into p pieces, and selecting one of the p pieces for a second area of the cell where each base station is located, and i, h, and p are integers greater than 0; and selecting an optimal spectrum division scheme and an optimal second area spectrum allocation scheme under the optimal spectrum division scheme, and sending the optimal spectrum division scheme and the optimal second area spectrum allocation scheme to the base station, so that the base station allocates a spectrum of the cell to the first area and second area of the cell according to the optimal spectrum division scheme and the optimal second area spectrum allocation scheme, where the optimal spectrum division scheme is one of the i spectrum division schemes, and the optimal second area spectrum allocation scheme is one of the h second area spectrum allocation schemes of the optimal spectrum division scheme.

As an optional implementation manner, the step of obtaining service distribution in a first area and service distribution in a second area of each base station among all base stations covered by a pre-specified network within a preset period performed by the processor 122 may specifically include:

obtaining service distribution of guarantee bit rate GBR services in the first area and service distribution of GBR services in the second area of each base station among all the base stations covered by the pre-specified network within the preset period.

The formulating i spectrum division schemes for the first area of the network and the second area of the network according to the obtained total service distribution in the first area of the network and total service distribution in the second area of the network performed by the processor 122 may specifically be:

calculating a ratio between the obtained total service distribution of GBR services in the first area of the network and total service distribution of GBR services in the second area of the network.

A multiple of the ratio is used as a spectrum division scheme for the first area and the second area, where a value of the multiple is a value in a set N, and values in the set N include i positive real numbers; in this way, i spectrum division schemes for the first area and the second area are obtained.

In this implementation manner, the obtained spectrum division scheme for the first area and the second area is specifically a multiple of the ratio between the obtained total service distribution of GBR services in the first area of the network and total service distribution of GBR services in the second area of the network.

As an optional implementation manner, the processor 122 may be further configured to perform the following steps:

obtaining service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station;

calculating a ratio between the obtained total service distribution in the first area of the network and total service distribution in the second area of the network; and using a multiple of the ratio as a spectrum division scheme for the first area of the network and the second area of the network, and formulating h second area spectrum allocation schemes under each spectrum division scheme, where a value of the multiple is a value in a set N, values in the set N include i positive real numbers, the second area spectrum allocation scheme refers to dividing a spectrum allocated to the second area into p pieces, and selecting one of the p pieces for a second area of the cell where each base station is located, and i, h, and p are integers greater than 0;

calculating a joint KPI which is of the network and corresponds to each second area spectrum allocation scheme; and selecting a second area spectrum allocation scheme corresponding to a minimum joint KPI of the network and a spectrum division scheme corresponding to the second area spectrum allocation scheme with the minimum joint KPI of the network, using the selected spectrum division scheme as an optimal spectrum division scheme, and using the selected second area spectrum allocation scheme as an optimal second area spectrum allocation scheme of the optimal spectrum division scheme.

Optionally, the joint KPI of the network may specifically include: a CDBR of GBR services of the network and a THP of Non-GBR services of the network.

Optionally, the calculating a joint KPI which is of the network and corresponds to each second area spectrum allocation scheme performed by the processor 122 may specifically include:

calculating a call dropping and blocking ratio CDBR which is of GBR services of the network and corresponds to each second area spectrum allocation scheme and a normalized throughput THP which is of non-guarantee bit rate services Non-GBR services of the network and corresponds to each second area spectrum allocation scheme; and calculating a joint KPI which is of the network and corresponds to each second area spectrum allocation scheme through the following formula:

$$FF(b, \eta) = \left(CDBR + \lambda * \left(1 - \frac{THP}{AMBR}\right)\right)$$

where $FF(b,\eta)$ is the joint KPI of the network, AMBR is a constant of an aggregate maximum bit rate of Non-GBR services, and $\lambda$ satisfies that $0 < \lambda \le 1$.

Optionally, the processor 122 may be further configured to perform the following steps:

calculating the CDBR which is of GBR services of the network and corresponds to each second area spectrum allocation scheme through the following formula:

$$CDBR(\bar{\rho}, MC) = \frac{\sum_{SC_i \in SC} \max(MC_i \cdot (1 - 1/\hat{\rho}_i), 0)}{\sum_{SC_i \in SC} MC_i}$$

where $SC_i$ is the first area or the second area, SC is a set of all $SC_i$ in the network, $MC_i$ and $\hat{\rho}_i$ are the number of activated users and an estimated load of GBR services in $SC_i$ respectively;

calculating the THP which is of Non-GBR services of the network and corresponds to each second area spectrum allocation scheme through the following formulas:

$$THP(\bar{\rho}, T, b) =$$
$$\sum_{SC_i \in SC} THP_i = \sum_{SC_i \in SC} k_i^{sch} \eta^{BW} (1 - \rho_i) W_i f\left(\left(Q_i + \sum_{\tau \in I_i} \rho_\tau R_{i,\tau}\right) / N_i\right)$$

where $k_i^{sch}$ and $\eta^{BW}$ are coefficients corresponding to a scheduler, $\rho_i$ is a real load of GBR services in $SC_i$, and $\rho_i = \min(1, \hat{\rho}_i)$, $W_i$ is a bandwidth which is of an allocated spectrum of $SC_i$ and corresponds to the second area spectrum allocation scheme, $I_i$ is a set of areas that interfere with $SC_i$, $\rho_\tau$ is an estimated load of GBR services and Non-GBR services in an area $\tau$, $R_{i,\tau}$ is a spectrum utilization rate, and $N_i$ is the number of activated users of Non-GBR services in $SC_i$; and $$f(x) = \frac{\log(2)}{\ln(1 + 1/x)}, \quad Q_i = \frac{P^{noise}}{\eta^{SINR}} \sum_{p \in SC_i} \frac{T(p)}{P_{p,i}};$$

where $P^{noise}$ is a noise volume, $\eta^{SINR}$ is a coefficient corresponding to a scheduler, $T(p)$ is the number of activated users of Non-GBR services at a pixel pi in $SC_i$, $P_{p,i}$ is receiving power at the pixel pi, the first area includes several pixels, the second area includes several pixels, and the pixel pi is a pixel in the first area or the second area.

Optionally, the processor 122 may be further configured to perform the following step:

calculating an estimated load which is of GBR services in the first area and corresponds to each second area spectrum allocation scheme and an estimated load which is of GBR services in the second area and corresponds to each second area spectrum allocation scheme through the following formulas respectively:

$$\hat{\rho}_i \le \frac{G_i}{W_i} f\left(\frac{N_i}{G_i} + \sum_{i' \in I_i} \frac{H_{i,i'} \min(\hat{\rho}_{i'}, 1)}{G_i}\right)$$

where $\hat{\rho}_i$ is an estimated load of GBR services in a subarea i, the subarea is the first area or the second area, and $I_i$ is a set of subareas that interfere with the subarea i; and $$f(x) = \frac{\log(2)}{\ln(1 + 1/x)}$$

$$G_i = \sum_{s \in S} \sum_{p \in SC_i} \frac{T_{s,p} D_s}{k_i^{sch} \eta^{BW}}$$

$$N_i = \sum_{s \in S} \sum_{p \in SC_i} \frac{T_{s,p} D_s \eta^{SINR} P^n}{k_i^{sch} \eta^{BW} P_i g_{i,p}}$$

$$H_{i,i'} = \sum_{s \in S} \sum_{p \in SC_i} \frac{T_{s,p} D_s \eta^{SINR} P_{i'} g_{i',p}}{k_i^{sch} \eta^{BW} P_i g_{i,p}}$$

where $P_i$ and $P_{i'}$ are transmit power of the subarea i and a subarea i' respectively, $g_{i,p}$ and $g_{i',p}$ are a channel gain from a base station to which the subarea i belongs to the pixel pi and a channel gain from a base station to which a neighboring subarea of the subarea i' belongs to the pixel pi respectively, the subarea i' is a neighboring subarea of the subarea i, $D_s$ is a data rate required by a service s among GBR services, $T_{s,p}$ is the number of activated users at the pixel pi in the subarea i, $T_{s,p} D_s$ represents service distribution of the service s at the pixel pi, and S represents a set of all services of GBR services.

Optionally, the processor 122 may be further configured to perform the following steps:

obtaining service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station;

calculating a ratio between the obtained total service distribution in the first area of the network and total service distribution in the second area of the network;

using a multiple of the ratio as a spectrum division scheme for the first area of the network and the second area of the network, and formulating h second area spectrum allocation schemes under each spectrum division scheme, where a value of the multiple is a value in a set N, values in the set N include i positive real numbers, the second area spectrum allocation scheme refers to dividing a spectrum allocated to the second area into p pieces, and selecting one of the p pieces for a second area of the cell where each base station is located, and i, h, and p are integers greater than 0; and performing a genetic algorithm to obtain a joint network performance indicator KPI corresponding to the second area spectrum allocation scheme, selecting a second area spectrum allocation scheme corresponding to a minimum joint KPI of the network and a spectrum division scheme corresponding to the second area spectrum allocation scheme with the minimum joint KPI of the network, and using the selected second area spectrum allocation scheme as an optimal second area spectrum allocation scheme of the optimal spectrum division scheme.

Optionally, for the foregoing genetic algorithm, reference may specifically be made to the calculation method provided in the foregoing embodiment.

In this implementation manner, an optimal second area spectrum allocation scheme with a minimum joint KPI of a network and an optimal spectrum division scheme corresponding to the optimal second area spectrum allocation scheme may be selected, and the selected optimal second area spectrum allocation scheme and optimal spectrum division scheme are sent to the base station. In this way, the base station allocates a spectrum of a cell to a first area of the base station and a second area of the base station according to the optimal spectrum division scheme, and then selects, according to the optimal second area spectrum allocation scheme, one piece of the spectrum allocated to the second area; a network KPI corresponding to the optimal second area spectrum allocation scheme of the optimal spectrum division scheme is minimum, and therefore, a utilization rate of a spectrum resource may be improved.

As an optional implementation manner, the processor 122 may be further configured to perform the following steps:

obtaining service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station;

calculating a ratio between the obtained total service distribution in the first area of the network and total service distribution in the second area of the network;

using a multiple of the ratio as a spectrum division scheme for the first area of the network and the second area of the network, and formulating h second area spectrum allocation schemes under each spectrum division scheme, where a value of the multiple is a value in a set N, values in the set N include i positive real numbers, the second area spectrum allocation scheme refers to dividing a spectrum allocated to the second area into p pieces, and selecting one of the p pieces for a second area of the cell where each base station is located, and i, h, and p are integers greater than 0;

predicting service distribution in the first area and the second area within a next preset period of a current preset period, where the current preset period is the preset period in the step of obtaining service distribution in a first area and service distribution in a second area of each base station among all base stations covered by a pre-specified network within a preset period;

calculating, according to the predicted service distribution, an estimated load which is of GBR services in the first area and corresponds to each second area spectrum allocation scheme and an estimated load which is of GBR services in the second area and corresponds to each second area spectrum allocation scheme;

calculating a CDBR which is of GBR services of the network and corresponds to each second area spectrum allocation scheme and a THP which is of Non-GBR services of the network and corresponds to each second area spectrum allocation scheme;

calculating a joint KPI which is of the network and corresponds to each second area spectrum allocation scheme through the following formula:

$$FF(b, \eta) = \left(CDBR + \lambda * \left(1 - \frac{THP}{AMBR}\right)\right)$$

where $FF(b,\eta)$ is the joint KPI of the network, AMBR is a constant of an aggregate maximum bit rate of Non-GBR services, and $\lambda$ satisfies that $0 < \lambda \leq 1$; and selecting a second area spectrum allocation scheme corresponding to a minimum joint KPI of the network and a spectrum division scheme corresponding to the second area spectrum allocation scheme with the minimum joint KPI of the network, using the selected spectrum division scheme as an optimal spectrum division scheme, and using the selected second area spectrum allocation scheme as an optimal second area spectrum allocation scheme of the optimal spectrum division scheme.

Optionally, the step of predicting service distribution in the first area and the second area within a next preset period of a current preset period performed by the processor 122 may specifically be:

predicting service distribution in the first area and the second area in the next preset period through the following formula:

$$L_t = \zeta \cdot (x_t - I_{t-d}) + (1-\zeta) \cdot L_{t-1}$$

$$I_t = \delta \cdot (x_t - L_t) + (1-\delta) \cdot I_{t-d}$$

$$\hat{x}_{t+h} = L_t + I_{t-d+h \bmod d}$$

where t is the current preset period; $L_t$ is a mean value part which is of the number of activated users of GBR services at a pixel pi and is calculated according to the number of activated users of GBR services at the pixel pi within t and a preset period before t; $I_t$ is a period part which is of the number of activated users of GBR services at the pixel pi and is calculated according to the number of activated users of GBR services at the pixel pi within t and a preset period before t; d is a period of time series of the number of activated users of the GBR services; $x_t$ is the number of activated users of GBR services at the pixel pi within t; $0 \leq \zeta \leq 1$ and $0 \leq \delta \leq 1$ are parameters for controlling smoothness; $\hat{x}_{t+h}$ is the number of activated users of GBR services at the pixel within the next preset period, and a value of h is 1.

In this implementation manner, it may be implemented that service distribution in a first area and a second area within a next preset period of a current preset period is predicted, an estimated load which is of GBR services in the first area and corresponds to each second area spectrum allocation scheme and an estimated load which is of GBR services in the second area and corresponds to each second area spectrum allocation scheme are calculated according to the predicted service distribution, and then a joint KPI which is of a network and corresponds to each second area spectrum allocation scheme is calculated, so as to select a second area spectrum allocation scheme corresponding to a minimum joint KPI of the network and a spectrum division scheme corresponding to the second area spectrum allocation scheme with the minimum joint KPI of the network, and use the selected spectrum division scheme as an optimal spectrum division scheme. In this way, a utilization rate of a spectrum resource may be improved.

As an optional implementation manner, the processor 122 may be further configured to perform the following steps:

obtaining service distribution in a first area and service distribution in a second area of each base station among all base stations covered by a pre-specified network within at least one preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station;

constructing a service distribution diagram of the network within the at least one preset period;

calculating a service distribution state of the service distribution diagram;

grouping similar service distribution states among service distribution states within the at least one preset period into one cluster, grouping temporally continuous preset periods in a same cluster into a time interval, obtaining, through statistics, a stable-state time interval in the time interval, and obtaining a stable state of the stable-state time interval, where the stable state is a mean value of all service distribution states within the stable-state time interval, and the stable-state time interval refers to a sub-time interval [a',b'] satisfying the following conditions:

$$a'=\min \{t \in [a,b]: \rho(v_t, E_{[a,b]}) > SST \times \rho(v_t, E_{[c,a-1]})\}$$

$$b'=\min \{t \in [a,b]: \rho(v_t, E_{[a,b]}) > SST \times \rho(v_t, E_{[b+1,d]})\}$$

$$a' < b';$$

where SST is a preset constant, [a',b'] is a sub-time interval, [a,b] is a time interval where [a',b'] is located, [c,a−1] and [b+1,d] are adjacent time intervals before and after [a,b] respectively, $\rho(f)$ is a difference value between a service distribution state within a time interval and a mean value of all service distribution states within the time interval, $v_t$ is a service distribution state within [a,b], and $E_{[a,b]}$ is a mean value of all service distribution states within [a,b];

calculating a ratio between the obtained total service distribution in the first area of the network and total service distribution in the second area of the network;

using a multiple of the ratio as a spectrum division scheme for the first area of the network and the second area of the network, and formulating h second area spectrum allocation schemes under each spectrum division scheme, where a value of the multiple is a value in a set N, values in the set N include i positive real numbers, the second area spectrum allocation scheme refers to dividing a spectrum allocated to the second area into p pieces, and selecting one of the p pieces for a second area of the cell where each base station is located, and i, h, and p are integers greater than 0;

calculating a joint KPI which is of the network at the stable state and corresponds to each second area spectrum allocation scheme; and selecting a second area spectrum allocation scheme corresponding to a minimum joint KPI of the network and a spectrum division scheme corresponding to the second area spectrum allocation scheme with the minimum joint KPI of the network, using the selected spectrum division scheme as an optimal spectrum division scheme, and using the selected second area spectrum allocation scheme as an optimal second area spectrum allocation scheme of the optimal spectrum division scheme.

Optionally, for the constructing a service distribution diagram, calculating a service distribution state of the service distribution diagram, and selecting a stable state, reference may specifically be made to the implementation manner provided in the foregoing embodiment.

In this implementation manner, it may be implemented that a joint network performance KPI which is at a stable state and corresponds to a second area spectrum allocation scheme is calculated; because a change of a service at the stable state is stable, an optimal spectrum division scheme and an optimal second area spectrum allocation scheme which are selected in this manner are more suitable for spectrum division of a cell, thereby improving a utilization rate of a spectrum of the cell, and at the same time, reducing a cost for spectrum adjustment.

Optionally, the control device may specifically be a device in an EMS or an NMS.

Optionally, the base station may specifically perform information transmission with the control device through an internal interface or a standard northbound interface of the control device.

It should be noted that, the input apparatus 121 may specifically be configured to receive the service distribution of the first area and the service distribution of the second area of the base station within the preset period, and transmit the received service distribution to the processor 122.

The output apparatus 123 may specifically be configured to send the optimal spectrum division scheme and the optimal second area spectrum allocation scheme under the optimal spectrum division scheme to the base station.

In the foregoing technical solution, service distribution in a first area and service distribution in a second area of each base station among all base stations covered by a pre-specified network within a preset period are obtained; i spectrum division schemes for a first area of the network and a second area of the network and h second area spectrum allocation schemes under each spectrum division scheme are formulated according to the obtained total service distribution in the first area of the network and total service distribution in the second area of the network; an optimal spectrum division scheme and an optimal second area spectrum allocation scheme of the optimal spectrum division scheme are selected; and the optimal spectrum division scheme and the optimal second area spectrum allocation scheme are sent to the base station, so that the base station allocates a spectrum of a cell to a first area and a second area according to the optimal spectrum division scheme and the optimal second area spectrum allocation scheme. In this way, spectrum division may change when service distribution changes, and is more suitable for a dynamic service, thereby improving a utilization rate of a spectrum resource.

Figure 14:
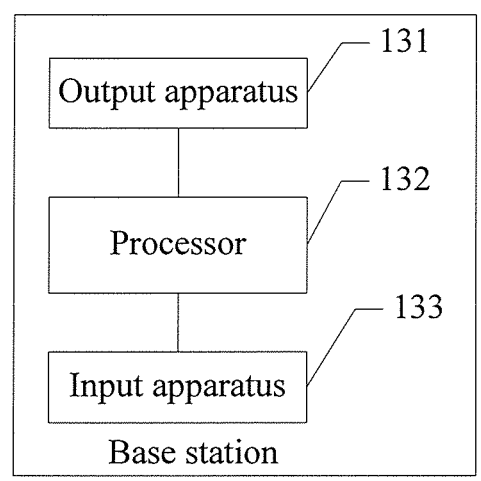
FIG. 14 is a schematic structural diagram of another base station provided by an embodiment of the present invention.

FIG. 14 is a schematic structural diagram of another base station provided by an embodiment of the present invention. As shown in FIG. 14, the base station includes: an output apparatus 131, a processor 132, and an input apparatus 133.

The processor 132 is configured to perform the following steps:

dividing a cell corresponding to a base station into a first area and a second area, where signal strength of the first area is greater than signal strength of the second area;

collecting statistics about service distribution in the first area and service distribution in the second area within a preset period, and sending the service distribution in the first area and the service distribution in the second area that are obtained through statistics to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme, where the second area spectrum allocation scheme refers to dividing a spectrum allocated to the second area into p pieces, and indicating to use one of the p pieces as a spectrum of a second area of the cell, i, h, and p are integers greater than 0, and the service distribution includes the number of activated users and a service volume;

receiving an optimal spectrum division scheme and an optimal second area spectrum allocation scheme that are sent by the control device, where the optimal spectrum division scheme is one of the i spectrum division schemes, and the optimal second area spectrum allocation scheme is one of the h second area spectrum allocation schemes of the optimal spectrum division scheme; and allocating a spectrum of the cell to the first area and the second area according to the optimal spectrum division scheme, and allocating a corresponding spectrum to the second area according to the optimal second area spectrum allocation scheme.

Optionally, after receiving service distribution of first areas and service distribution of second areas in the preset period sent by all base stations covered by the pre-specified network, the control device may formulate, according to obtained total service distribution in the first area of the network and total service distribution in the second area of the network, i spectrum division schemes for the first area of the network and the second area of the network and h second area spectrum allocation schemes under each spectrum division scheme, where the second area spectrum allocation scheme refers to dividing a spectrum allocated to the second area into p pieces and selecting one of the p pieces for the second area of the cell where each base station is located. An optimal spectrum division scheme and an optimal second area spectrum allocation scheme of the optimal spectrum division scheme are selected; and the optimal spectrum division scheme and the optimal second area spectrum allocation scheme are sent to the base station.

Optionally, after receiving service distribution of first areas and service distribution of second areas in the preset period sent by all base stations covered by the pre-specified network, the control device may calculate a ratio between the obtained total service distribution in the first area of the network and total service distribution in the second area of the network, and use a multiple of the ratio as a spectrum division scheme for the first area of the network and the second area of the network, where a value of the multiple is a value in a set N, and values in the set N include i positive real numbers. Then, the optimal spectrum division scheme received in the foregoing step specifically is a multiple of the ratio between the total service distribution in the first area of the network and the total service distribution in the second area of the network received by the control device, where a value of the multiple is a value in a set N, and values in the set N include i positive real numbers.

Optionally, the optimal spectrum division scheme and the optimal second area spectrum allocation scheme in the step of receiving an optimal spectrum division scheme and an optimal second area spectrum allocation scheme that are sent by the control device performed by the processor 132 may specifically be a second area spectrum allocation scheme which is formulated by the control device and corresponds to a minimum joint KPI of the network and a spectrum division scheme which is formulated by the control device and corresponds to the second area spectrum allocation scheme with the minimum joint KPI of the network.

Optionally, the step of collecting statistics about service distribution in the first area and service distribution in the second area within a preset period, and sending the service distribution in the first area and the service distribution in the second area that are obtained through statistics to a control device performed by the processor 132 may specifically be: collecting statistics about service distribution of guarantee bit rate GBR services in the first area and service distribution of GBR services in the second area within the preset period, and sending the service distribution of guarantee bit rate GBR services in the first area and service distribution of GBR services in the second area that are obtained through statistics to the control device.

Optionally, the optimal spectrum division scheme in the step of receiving an optimal spectrum division scheme and an optimal second area spectrum allocation scheme that are sent by the control device performed by the processor 132 may specifically be: a multiple of a ratio between the total service distribution of GBR services in the first area of the network and the total service distribution of GBR services in the second area of the network of all base stations covered by the pre-specified network obtained by the control device, where a value of the multiple is a value in a set N, and values in the set N include i positive real numbers.

As an optional implementation manner, the control device may specifically be a device in an EMS or an NMS.

Optionally, the base station may specifically perform information transmission with the control device through an internal interface or a standard northbound interface of the control device.

It should be noted that, the output apparatus 131 may specifically be configured to send service distribution in the first area and service distribution in the second area to the control device.

The input apparatus 133 may specifically be configured to receive an optimal spectrum division scheme and an optimal second area spectrum allocation scheme that are sent by the control device, and transmit the optimal spectrum division scheme and the optimal second area spectrum allocation scheme to the processor 132.

In the foregoing technical solution, a cell corresponding to a base station is divided into a first area and a second area; statistics about service distribution in the first area and service distribution in the second area within a preset period is collected, and the service distribution in the first area and the service distribution in the second area that are obtained through statistics are sent to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme; an optimal spectrum division scheme and an optimal second area spectrum allocation scheme that are sent by the control device are received, a spectrum of the cell is allocated to the first area and the second area according to the optimal spectrum division scheme, and a corresponding spectrum is allocated to the second area according to the optimal second area spectrum allocation scheme. In this way, spectrum division may change when service distribution changes, and is more suitable for a dynamic service, thereby improving a utilization rate of a spectrum resource.

Figure 15:
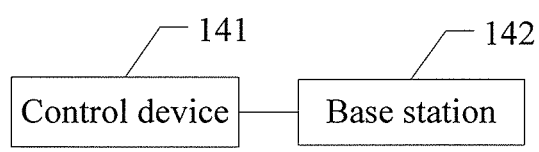
FIG. 15 is a schematic structural diagram of another spectrum division system provided by an embodiment of the present invention.

FIG. 15 is a schematic structural diagram of another spectrum division system provided by an embodiment of the present invention. As shown in FIG. 15, the system includes: a control device 141 and a base station 142.

The control device 141 may include: an input apparatus, a processor, and an output apparatus.

The processor is configured to perform the following steps:

obtaining service distribution in a first area and service distribution in a second area of each base station among all base stations covered by a pre-specified network within a preset period, where a set of the first area and the second area of each base station is a cell where each base station is located, the service distribution includes the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station;

formulating, according to the obtained total service distribution in the first area of the network and total service distribution in the second area of the network, i spectrum division schemes for the first area of the network and the second area of the network and h second area spectrum allocation schemes corresponding to each spectrum division scheme, where the second area spectrum allocation scheme refers to dividing a spectrum allocated to the second area of the network into p pieces, and selecting one of the p pieces for a second area of the cell where each base station is located, and i, h, and p are integers greater than 0; and selecting an optimal spectrum division scheme and an optimal second area spectrum allocation scheme under the optimal spectrum division scheme, and sending the optimal spectrum division scheme and the optimal second area spectrum allocation scheme to the base station, so that the base station allocates a spectrum of the cell to the first area and second area of the cell according to the optimal spectrum division scheme and the optimal second area spectrum allocation scheme, where the optimal spectrum division scheme is one of the i spectrum division schemes, and the optimal second area spectrum allocation scheme is one of the h second area spectrum allocation schemes of the optimal spectrum division scheme.

The base station 142 may include: an output apparatus, a processor, and an input apparatus.

The processor is configured to perform the following steps:

dividing a cell corresponding to a base station into a first area and a second area, where signal strength of the first area is greater than signal strength of the second area;

collecting statistics about service distribution in the first area and service distribution in the second area within a preset period, and sending the service distribution in the first area and the service distribution in the second area that are obtained through statistics to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme, where the second area spectrum allocation scheme refers to dividing a spectrum allocated to the second area into p pieces, and indicating to use one of the p pieces as a spectrum of the second area of the cell, i, h, and p are integers greater than 0, and the service distribution includes the number of activated users and a service volume;

receiving an optimal spectrum division scheme and an optimal second area spectrum allocation scheme that are sent by the control device, where the optimal spectrum division scheme is one of the i spectrum division schemes, and the optimal second area spectrum allocation scheme is one of the h second area spectrum allocation schemes of the optimal spectrum division scheme; and allocating a spectrum of the cell to the first area and the second area according to the optimal spectrum division scheme, and allocating a corresponding spectrum to the second area according to the optimal second area spectrum allocation scheme.

In the foregoing technical solution, the control device receives service distribution in a first area and service distribution in a second area of a base station within a preset period, formulates, according to the obtained total service distribution in the first area of the network and total service distribution in the second area of the network, i spectrum division schemes for the first area of the network and the second area of the network and h second area spectrum allocation schemes under each spectrum division scheme, selects an optimal spectrum division scheme and an optimal second area spectrum allocation scheme of the optimal spectrum division scheme, and sends the optimal spectrum division scheme and the optimal second area spectrum allocation scheme to the base station, so that the base station allocates a spectrum of a cell to a first area and a second area according to the optimal spectrum division scheme and the optimal second area spectrum allocation scheme, and allocates a corresponding spectrum to the second area according to the optimal second area spectrum allocation scheme. In this way, spectrum division may change when service distribution changes, and is more suitable for a dynamic service, thereby improving a utilization rate of a spectrum resource.

A person of ordinary skill in the art may understand that all or a part of the processes of the methods in the foregoing embodiments may be implemented by a computer program instructing relevant hardware. The program may be stored in a computer readable storage medium. When the program runs, the processes of the foregoing methods in the embodiments are performed. The storage medium may be a magnetic disk, an optical disk, a read-only memory (Read-Only Memory, ROM), or a random access memory (Random Access Memory, RAM), or the like.

The foregoing disclosed descriptions are merely exemplary embodiments of the present invention, and certainly, are not intended to limit the scope of the claims of the present invention. Therefore, equivalent variations made according to the claims of the present invention shall fall within the protection scope of the present invention.

What is claimed is:

1. A spectrum division method, comprising:
    obtaining service distribution in a first area and service distribution in a second area of each base station among all base stations covered by a pre-specified network within a preset period, wherein a set of the first area and the second area of each base station is a cell where each base station is located, the service distribution comprises the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station;

formulating, according to the obtained total service distribution in the first area of the network and total service distribution in the second area of the network, i spectrum division schemes for the first area of the network and the second area of the network and h second area spectrum allocation schemes corresponding to each spectrum division scheme, wherein the second area spectrum allocation scheme refers to dividing a spectrum allocated to the second area of the network into p pieces, and selecting one of the p pieces for a second area of the cell where each base station is located, and i, h, and p are integers greater than 0; and selecting an optimal spectrum division scheme and an optimal second area spectrum allocation scheme under the optimal spectrum division scheme, and sending the optimal spectrum division scheme and the optimal second area spectrum allocation scheme to the base station, so that the base station allocates a spectrum of the cell to the first area and second area of the cell according to the optimal spectrum division scheme and the optimal second area spectrum allocation scheme, wherein the optimal spectrum division scheme is one of the i spectrum division schemes, and the optimal second area spectrum allocation scheme is one of the h second area spectrum allocation schemes of the optimal spectrum division scheme.

2. The method according to claim 1, wherein formulating i spectrum division schemes for the first area of the network and the second area of the network comprises:

calculating a ratio between the obtained total service distribution in the first area of the network and total service distribution in the second area of the network; and using a multiple of the ratio as a spectrum division scheme for the first area of the network and the second area of the network, wherein a value of the multiple is a value in a set N, and values in the set N comprise i positive real numbers.

3. The method according to claim 2, wherein obtaining service distribution in a first area and service distribution in a second area of each base station among all base stations covered by a pre-specified network within a preset period comprises:

obtaining service distribution of guarantee bit rate (GBR) services in the first area and service distribution of GBR services in the second area of each base station among all the base stations covered by the pre-specified network within the preset period; and the calculating a ratio between the obtained total service distribution in the first area of the network and total service distribution in the second area of the network comprises:

calculating a ratio between the obtained total service distribution of GBR services in the first area and total service distribution of GBR services in the second area.

4. The method according to claim 1, wherein selecting an optimal spectrum division scheme and an optimal second area spectrum allocation scheme under the optimal spectrum division scheme comprises:

calculating a joint key performance indicator (KPI) which is of the network and corresponds to each second area spectrum allocation scheme; and selecting a second area spectrum allocation scheme corresponding to a minimum joint KPI of the network and a spectrum division scheme corresponding to the second area spectrum allocation scheme with the minimum joint KPI of the network, using the selected spectrum division scheme as an optimal spectrum division scheme, and using the selected second area spectrum allocation scheme as an optimal second area spectrum allocation scheme of the optimal spectrum division scheme.

5. The method according to claim 3, wherein calculating a joint KPI which is of the network and corresponds to each second area spectrum allocation scheme comprises:

calculating a call dropping and blocking ratio (CDBR) which is of GBR services of the network and corresponds to each second area spectrum allocation scheme and a normalized throughput (THP) which is of non-guarantee bit rate services Non-GBR services of the network and corresponds to each second area spectrum allocation scheme; and calculating a joint KPI which is of the network and corresponds to each second area spectrum allocation scheme through the following formula:

$$FF(b, \eta) = \left(CDBR + \lambda * \left(1 - \frac{THP}{AMBR}\right)\right)$$

wherein $FF(b,\eta)$ is the joint KPI of the network, AMBR is a constant of an aggregate maximum bit rate of Non-GBR services, and $\lambda$ satisfies that $0 < \lambda \leq 1$.

6. The method according to claim 5, wherein calculating a CDBR which is of GBR services of the network and corresponds to each second area spectrum allocation scheme and a THP which is of Non-GBR services of the network and corresponds to each second area spectrum allocation scheme comprises:

calculating the CDBR which is of GBR services of the network and corresponds to each second area spectrum allocation scheme through the following formula:

$$CDBR(\bar{\rho}, MC) = \frac{\sum_{SC_i \in SC} \max(MC_i \cdot (1 - 1/\hat{\rho}_i), 0)}{\sum_{SC_i \in SC} MC_i}$$

wherein $SC_i$ is the first area or the second area, SC is a set of all $SC_i$ in the network, $MC_i$ and $\hat{\rho}_i$ are the number of activated users and an estimated load of GBR services in $SC_i$ respectively; and calculating the THP which is of Non-GBR services of the network and corresponds to each second area spectrum allocation scheme through the following formulas:

$$THP(\bar{\rho}, T, b) = \sum_{SC_i \in SC} THP_i = \sum_{SC_i \in SC} k_i^{sch} \eta^{BW} (1 - \rho_i) W_i f\left(\left(Q_i + \sum_{\tau \in l_i} \rho_\tau R_{i,\tau}\right) / N_i\right)$$

wherein $k_i^{sch}$ and $\eta^{BW}$ are coefficients corresponding to a scheduler, $\hat{\rho}_i$ is a real load of GBR services in $SC_i$, and $\rho_i = \min(1, \hat{\rho}_i)$, $W_i$ is a bandwidth which is of an allocated spectrum of $SC_i$ and corresponds to the second area spectrum allocation scheme, $I_i$ is a set of areas that interfere with $SC_i$, $\rho_\tau$ is an estimated load of GBR services and Non-GBR services in an area $\tau$, $R_{i,\tau}$ is a spectrum utilization rate, and $N_i$ is the number of activated users of Non-GBR services in $SC_i$; and $$f(x) = \frac{\log(2)}{\ln(1+1/x)}, \quad Q_i = \frac{P^{noise}}{\eta^{SINR}} \sum_{p \in SC_i} \frac{T(p)}{P_{p,i}};$$

wherein $P^{noise}$ is a noise volume, $\eta^{SINR}$ is a coefficient corresponding to a scheduler, $T(p)$ is the number of activated users of Non-GBR services at a pixel pi in $SC_i$, $P_{p,i}$ is receiving power at the pixel pi, the first area comprises several pixels, the second area comprises several pixels, and the pixel pi is a pixel in the first area or the second area.

7. The method according to claim 6, wherein after obtaining service distribution of guarantee bit rate services GBR services in the first area and service distribution of GBR services in the second area of each base station among all the base stations covered by the pre-specified network, and before calculating a CDBR which is of GBR services of the network and corresponds to each second area spectrum allocation scheme, the method further comprises:
calculating an estimated load which is of GBR services in the first area and corresponds to each second area spectrum allocation scheme and an estimated load which is of GBR services in the second area and corresponds to each second area spectrum allocation scheme through the following formulas respectively:

$$\hat{\rho}_i \leq \frac{G_i}{W_i} f\left(\frac{N_i}{G_i} + \sum_{i' \in I_i} \frac{H_{i,i'} \min(\hat{\rho}_{i'}, 1)}{G_i}\right)$$

wherein $\hat{\rho}_i$ is an estimated load of GBR services in a subarea i, the subarea is the first area or the second area, and $I_i$ is a set of subareas that interfere with the subarea i; and $$f(x) = \frac{\log(2)}{\ln(1+1/x)}$$

$$G_i = \sum_{s \in S} \sum_{p \in SC_i} \frac{T_{s,p} D_s}{k_i^{sch} \eta^{BW}}$$

$$N_i = \sum_{s \in S} \sum_{p \in SC_i} \frac{T_{s,p} D_s \eta^{SINR} P^n}{k_i^{sch} \eta^{BW} P_i g_{i,p}}$$

$$H_{i,i'} = \sum_{s \in S} \sum_{p \in SC_i} \frac{T_{s,p} D_s \eta^{SINR} P_{i'} g_{i',p}}{k_i^{sch} \eta^{BW} P_i g_{i,p}}$$

wherein $P_i$ and $P_{i'}$ are transmit power of the subarea i and a subarea i' respectively, $g_{i,p}$ and $g_{i',p}$ are a channel gain from a base station to which the subarea i belongs to the pixel pi and a channel gain from a base station to which a neighboring subarea of the subarea i' belongs to the pixel pi respectively, the subarea i' is a neighboring subarea of the subarea i, $D_s$ is a data rate required by a service s among GBR services, $T_{s,p}$ is the number of activated users at the pixel pi in the subarea i, $T_{s,p} D_s$ represents service distribution of the service s at the pixel pi, and S represents a set of all services of GBR services.

8. The method according to claim 6, wherein after obtaining service distribution in a first area and service distribution in a second area of each base station among all base stations covered by a pre-specified network within a preset period, and before calculating a CDBR which is of GBR services of the network and corresponds to each second area spectrum allocation scheme, the method further comprises:
predicting service distribution in the first area and the second area within a next preset period of a current preset period; and
calculating, according to the predicted service distribution, an estimated load which is of GBR services in the first area and corresponds to each second area spectrum allocation scheme and an estimated load which is of GBR services in the second area and corresponds to each second area spectrum allocation scheme,
wherein the current preset period is the preset period in the step of obtaining service distribution in a first area and service distribution in a second area of each base station among all base stations covered by a pre-specified network within a preset period.

9. The method according to claim 8, wherein predicting service distribution in the first area and the second area within a next preset period of a current preset period comprises:
predicting service distribution in the first area and the second area in the next preset period through the following formula:

$$L_t = \zeta \cdot (x_t - I_{t-d}) + (1-\zeta) \cdot L_{t-1}$$

$$I_t = \delta \cdot (x_t - L_t) + (1-\delta) \cdot I_{t-d}$$

$$\hat{x}_{t+h} = L_t + I_{t-d+h \bmod d}$$

wherein t is the current preset period; $L_t$ is a mean value part which is of the number of activated users of GBR services at a pixel pi and is calculated according to the number of activated users of GBR services at the pixel pi within t and a preset period before t; $I_t$ is a period part which is of the number of activated users of GBR services at the pixel pi and is calculated according to the number of activated users of GBR services at the pixel pi within t and a preset period before t; d is a period of time series of the number of activated users of the GBR services; $x_t$ is the number of activated users of GBR services at the pixel pi within t; $0 \leq \zeta \leq 1$ and $0 \leq \delta \leq 1$ are parameters for controlling smoothness; $\hat{x}_{t+h}$ is the number of activated users of GBR services at the pixel within the next preset period, and a value of h is 1.

10. The method according to claim 3, wherein obtaining service distribution in a first area and service distribution in a second area of each base station among all base stations covered by a pre-specified network within a preset period comprises:
obtaining service distribution in the first area and service distribution in the second area of each base station among all the base stations covered by the pre-specified network within at least one preset period;
wherein after the obtaining service distribution in the first area and service distribution in the second area of each base station among all the base stations covered by the pre-specified network within at least one preset period, and before the calculating a joint KPI which is of the network and corresponds to each second area spectrum allocation scheme, the method further comprises:

constructing a service distribution diagram of the network within the at least one preset period;
calculating a service distribution state of the service distribution diagram;
grouping similar service distribution states among service distribution states within the at least one preset period into one cluster, grouping temporally continuous preset periods in a same cluster into a time interval, obtaining, through statistics, a stable-state time interval in the time interval, and obtaining a stable state of the stable-state time interval,
wherein the stable state is a mean value of all service distribution states within the stable-state time interval, and the stable-state time interval refers to a sub-time interval [a',b'] satisfying the following conditions:

$$a'=\min\{t \in [a,b]: \rho(v_t, E_{[a,b]}) > SST \times \rho(v_t, E_{[c,a-1]})\}$$

$$b'=\min\{t \in [a,b]: \rho(v_t, E_{[a,b]}) > SST \times \rho(v_t, E_{[b+1,d]})\},$$

$$a' < b';$$

wherein SST is a preset constant, [a',b'] is a sub-time interval, [a,b] is a time interval where [a',b'] is located, [c,a−1] and [b+1,d] are adjacent time intervals before and after [a,b] respectively, $\rho(f)$ is a difference value between a service distribution state within a time interval and a mean value of all service distribution states within the time interval, $v_t$ is a service distribution state within [a,b], and $E_{[a,b]}$ is a mean value of all service distribution states within [a,b].

11. The method according to claim 10, wherein grouping similar service distribution states within the at least one preset period into one cluster, grouping temporally continuous preset periods in a same cluster into a time interval, obtaining, through statistics, a stable-state time interval in the time interval, and obtaining a stable state of the stable-state time interval comprises:
(1) getting the number of clusters k, wherein k=2;
(2) evenly distributing the service distribution states within the at least one preset period to the k clusters randomly;
(3) traversing each cluster, and calculating a mean value of all service distribution states within each cluster;
(4) traversing the service distribution state within each preset period, and grouping service distribution states which are of the preset periods and whose difference values with the mean value are within a certain range into a cluster, to generate a new clustering result;
(5) performing steps (3)-(4) repeatedly until the newly generated clustering result does not change any more;
(6) calculating a sum of central difference values of all clusters, wherein the central difference value refers to a difference value between a service distribution state of each preset period in the cluster and the mean value of the cluster;
(7) performing steps (2)-(6) repeatedly for a specified number of times, and selecting a clustering result whose sum of central difference values of all clusters is minimum;
(8) grouping temporally continuous preset periods in each cluster of the minimum clustering result obtained through statistics into a time interval, and obtaining, through statistics, a stable-state time interval in the time interval, wherein a mean value of service distribution states in the stable-state time interval forms a stable state;

(9) calculating a local minimal value through the following formula:

$$SSIndex(cl) = \frac{k \times DDS(cl)}{NSS^2}$$

$$DSS(cl) = \sum_{j=1\ldots m} \sum_{i \in [s_j, f_j]} \rho(v_i, E_j)^2$$

$$NSS = (f_1 - S_1 + 1) + \ldots + (f_m - S_m + 1)$$

wherein SSIndex(cl) is the local minimal value, $[s_1, f_1], \ldots [s_m, f_m]$ are stable-state time intervals identified in step (8), Ej is a mean value of all service distribution states in a stable-state time interval j identified in step (8);
(10) making k=k+1, and performing steps (2)-(9) repeatedly until k=$k_0$, wherein $k_0$ is an integer greater than 1; and
(11) selecting a minimum local minimal value from multiple local minimal values calculated by performing step (9) repeatedly, and obtaining a stable-state time interval and a stable state in each cluster which are obtained through statistics in step (8) and correspond to the minimum local minimal value.

12. The method according to claim 10, wherein calculating a joint KPI which is of the network and corresponds to each second area spectrum allocation scheme comprises:
calculating a joint KPI which is of the network at the stable state and corresponds to each second area spectrum allocation scheme.

13. The method according to claim 12, wherein calculating a joint KPI which is of the network at the stable state and corresponds to each second area spectrum allocation scheme comprises:
calculating a CDBR which is of GBR services of the network at the stable state and corresponds to each second area spectrum allocation scheme and a THP which is of Non-GBR services of the network at the stable state and corresponds to each second area spectrum allocation scheme; and
calculating the joint KPI of the network at the stable state through the following formula:

$$FF(b, \eta) = \sum_{ss \in SS} T_{ss} FF_{ss}(b, \eta) = \sum_{ss \in SS} \left( T_{ss} \sum_{SC_i \in SC} \left( CDBR_{ss,i} + \lambda * \left(1 - \frac{THP_{ss,i}}{AMBR_i}\right) \right) \right)$$

wherein FF(b,η) is a joint KPI of the network at the stable state, ss is a stable state ss, SS is a set of stable states, $T_{ss}$ is a duration of the stable state ss, $FE_{ss}$=(b,η) is a joint KPI of the network at the stable state ss, $SC_i$ is a subarea SCi, $SC_i$ is the first area or the second area, SC is a set of all $SC_i$ in the network; $CDBR_i$ is a CDBR of GBR services in $SC_i$ at the stable state ss, $THP_i$ is a THP of Non-GBR services in $SC_i$ at the stable state ss, $AMBR_i$ is a constant of an aggregate maximum bit rate of Non-GBR services in $SC_i$.

14. The method according to claim 3, wherein after selecting an optimal spectrum division scheme and an optimal second area spectrum allocation scheme under the optimal spectrum division scheme, and before sending the optimal spectrum division scheme and the optimal second area spectrum allocation scheme to the base station, the method further comprises:

determining whether the joint KPI which is of the network and corresponds to the optimal second area spectrum allocation scheme is greater than a current joint KPI of the network, and if yes, sending the optimal spectrum division scheme and the optimal second area spectrum allocation scheme to the base station.

15. A spectrum division method, comprising:
dividing a cell corresponding to a base station into a first area and a second area, wherein signal strength of the first area is greater than signal strength of the second area;
collecting statistics about service distribution in the first area and service distribution in the second area within a preset period, and sending the service distribution in the first area and the service distribution in the second area that are obtained through statistics to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme, wherein the second area spectrum allocation scheme refers to dividing a spectrum allocated to the second area into p pieces, and indicating to use one of the p pieces as a spectrum of the second area of the cell, i, h, and p are integers greater than 0, and the service distribution comprises the number of activated users and a service volume;
receiving an optimal spectrum division scheme and an optimal second area spectrum allocation scheme that are sent by the control device, wherein the optimal spectrum division scheme is one of the i spectrum division schemes, and the optimal second area spectrum allocation scheme is one of the h second area spectrum allocation schemes under the optimal spectrum division scheme; and
allocating a spectrum of the cell to the first area and the second area according to the optimal spectrum division scheme, and allocating a corresponding spectrum to the second area according to the optimal second area spectrum allocation scheme.

16. The method according to claim 15, wherein formulating i spectrum division schemes for the first area of the network and the second area of the network comprises:
calculating a ratio between the obtained total service distribution in the first area of the network and total service distribution in the second area of the network; and
using a multiple of the ratio as a spectrum division scheme for the first area of the network and the second area of the network, wherein a value of the multiple is a value in a set N, and values in the set N comprise i positive real numbers.

17. The method according to claim 15 wherein the service distribution is guarantee bit rate (GBR) service distribution.

18. A control device, comprising:
an obtaining unit configured to obtain service distribution in a first area and service distribution in a second area of each base station among all base stations covered by a pre-specified network within a preset period, wherein a set of the first area and the second area of each base station is a cell where each base station is located, the service distribution comprises the number of activated users and a service volume, service distribution in first areas of all the base stations forms total service distribution in a first area of the network, service distribution in second areas of all the base stations forms total service distribution in a second area of the network, and signal strength of the first area is greater than signal strength of the second area of each base station;
a formulating unit configured to formulate, according to the obtained total service distribution in the first area of the network and total service distribution in the second area of the network, i spectrum division schemes for the first area of the network and the second area of the network and h second area spectrum allocation schemes corresponding to each spectrum division scheme, wherein the second area spectrum allocation scheme refers to dividing a spectrum allocated to the second area of the network into p pieces, and selecting one of the p pieces for a second area of the cell where each base station is located, and i, h, and p are integers greater than 0; and
a selecting and sending unit configured to select an optimal spectrum division scheme and an optimal second area spectrum allocation scheme under the optimal spectrum division scheme, and send the optimal spectrum division scheme and the optimal second area spectrum allocation scheme to the base station, so that the base station allocates a spectrum of the cell to the first area and second area of the cell according to the optimal spectrum division scheme and the optimal second area spectrum allocation scheme, wherein the optimal spectrum division scheme is one of the i spectrum division schemes, and the optimal second area spectrum allocation scheme is one of the h second area spectrum allocation schemes of the optimal spectrum division scheme.

19. A base station, comprising:
an area dividing unit configured to divide a cell corresponding to a base station into a first area and a second area, wherein signal strength of the first area is greater than signal strength of the second area;
a statistics collecting unit configured to collect statistics about service distribution in the first area and service distribution in the second area within a preset period, and send the service distribution in the first area and the service distribution in the second area that are obtained through statistics to a control device of a network that covers the base station, so that the control device of the network obtains total service distribution in a first area of the network and total service distribution in a second area of the network according to the received service distribution in the first area and service distribution in the second area of each base station in the network, and formulates i spectrum division schemes for the first area of the network and the second area of the network and h second area spectrum allocation schemes under each spectrum division scheme, wherein the second area spectrum allocation scheme refers to dividing a spectrum allocated to the second area into p pieces, and indicating to use one of the p pieces as a spectrum of the second area of the cell, i, h, and p are integers greater than 0, and the service distribution comprises the number of activated users and a service volume;
a receiving unit configured to receive an optimal spectrum division scheme and an optimal second area spectrum allocation scheme that are sent by the control device, wherein the optimal spectrum division scheme is one of the i spectrum division schemes, and the optimal second area spectrum allocation scheme is one of the h second area spectrum allocation schemes under the optimal spectrum division scheme; and a spectrum dividing unit configured to allocate a spectrum of the cell to the first area and the second area according to the optimal spectrum division scheme received by the receiving unit, and allocate a corresponding spectrum to the second area according to the optimal second area spectrum allocation scheme.

* * * * *